April 23, 1940.  F. L. SNYDER  2,198,489
POWER TRANSFORMER
Filed Dec. 23, 1937  10 Sheets-Sheet 1

WITNESSES:
E. A. McCloskey.
F. E. Hardy

INVENTOR
Franklin L. Snyder.
BY Ezra W. Savage
ATTORNEY

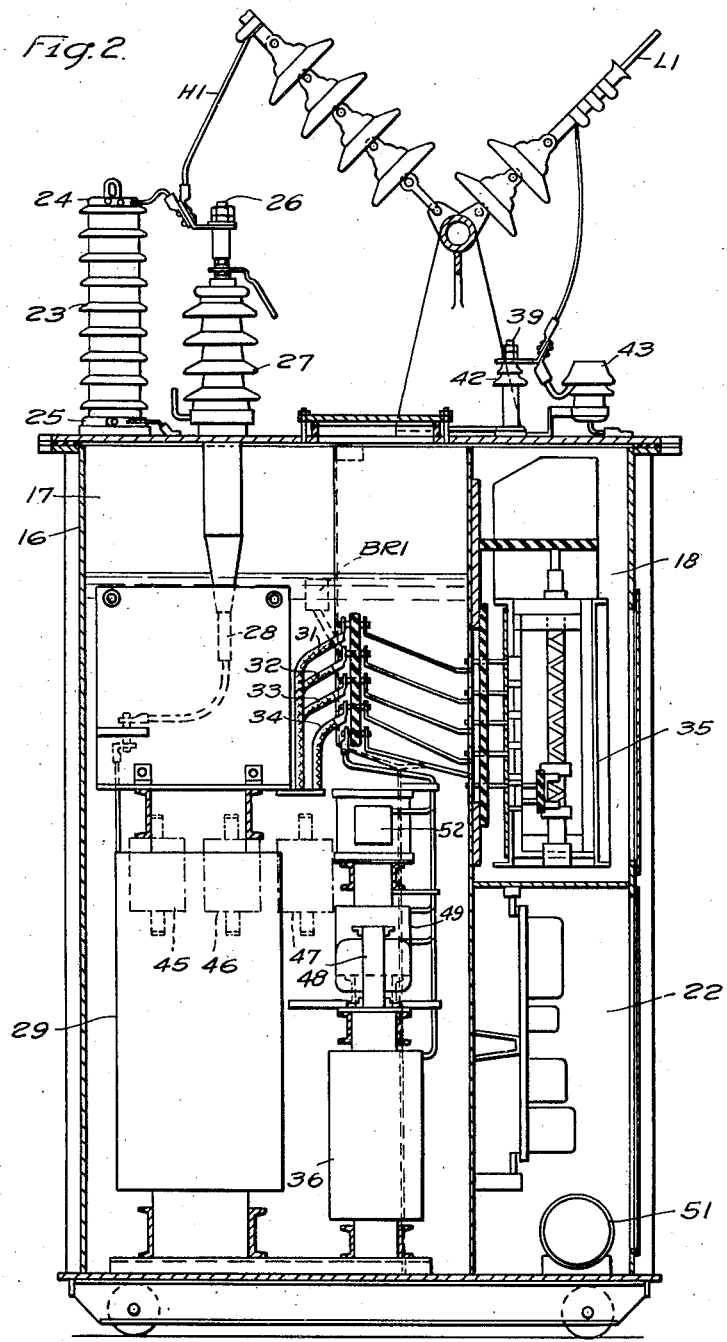

April 23, 1940.   F. L. SNYDER   2,198,489
POWER TRANSFORMER
Filed Dec. 23, 1937   10 Sheets-Sheet 3

WITNESSES:
E. A. McCloskey.
J. E. Hardy.

INVENTOR
Franklin L. Snyder.
BY
Ezra W. Savage
ATTORNEY

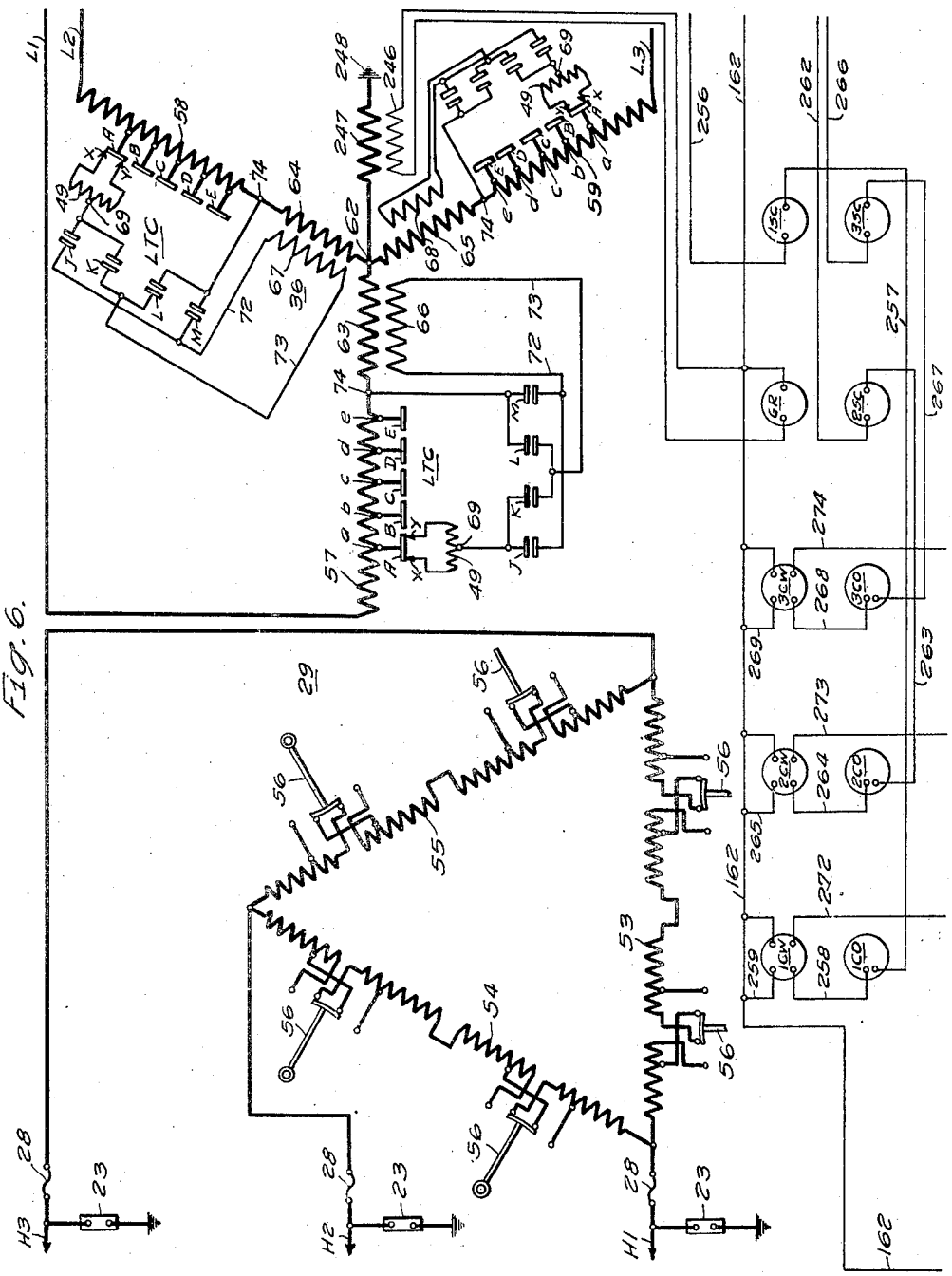

April 23, 1940. F. L. SNYDER 2,198,489
POWER TRANSFORMER
Filed Dec. 23, 1937 10 Sheets-Sheet 5

WITNESSES: INVENTOR
E. A. McCloskey Franklin L. Snyder
F. E. Hardy BY Ezra W. Savage
ATTORNEY April 23, 1940.  F. L. SNYDER  2,198,489
POWER TRANSFORMER
Filed Dec. 23, 1937    10 Sheets-Sheet 6
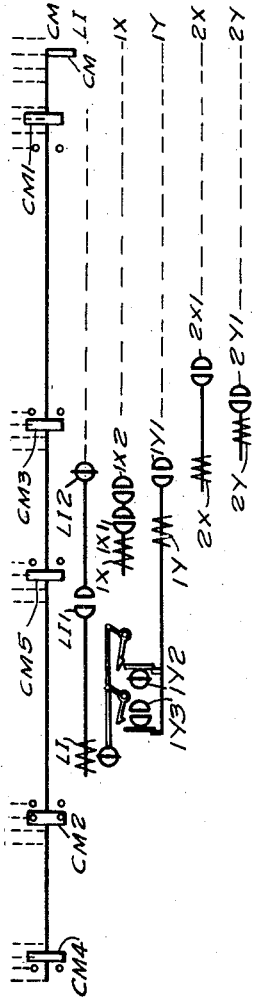
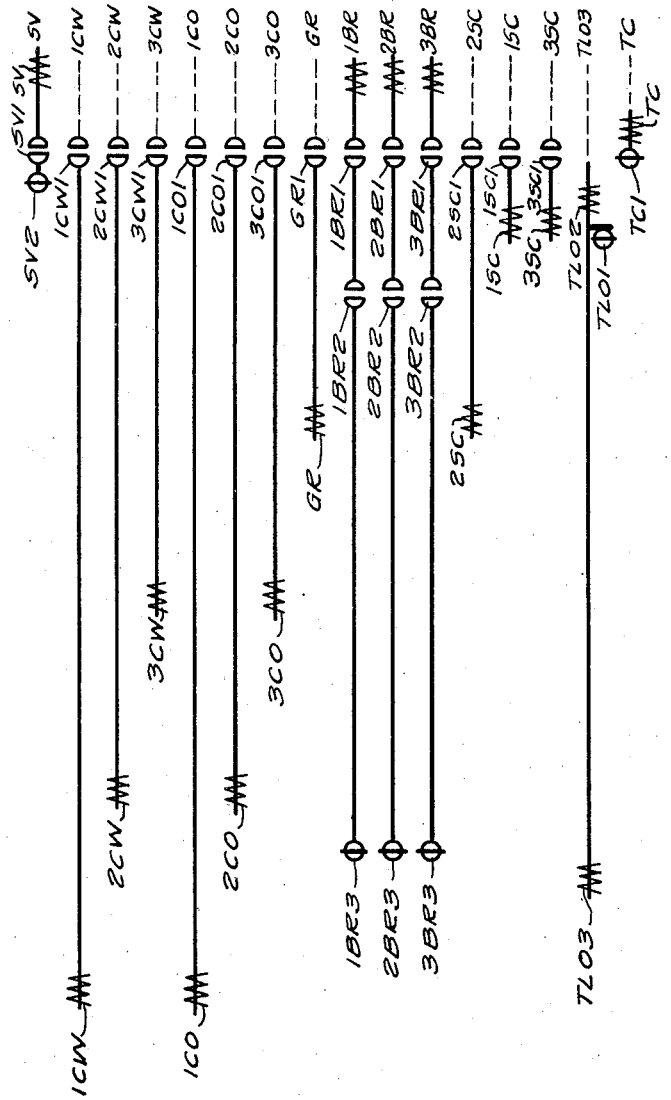
Fig. 6B
WITNESSES:
E. A. McCloskey
F. E. Hardy
INVENTOR
Franklin L. Snyder.
BY
ATTORNEY

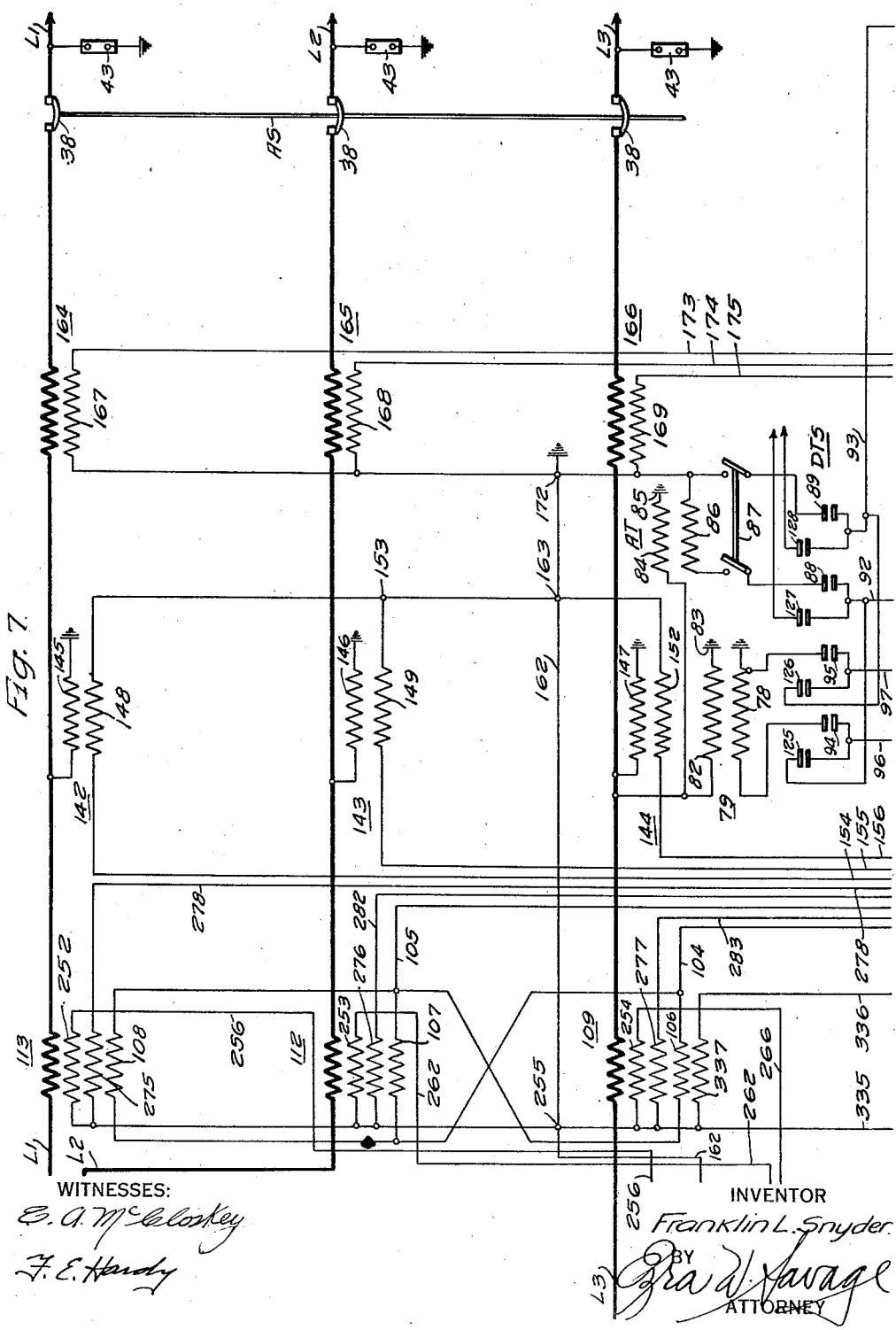

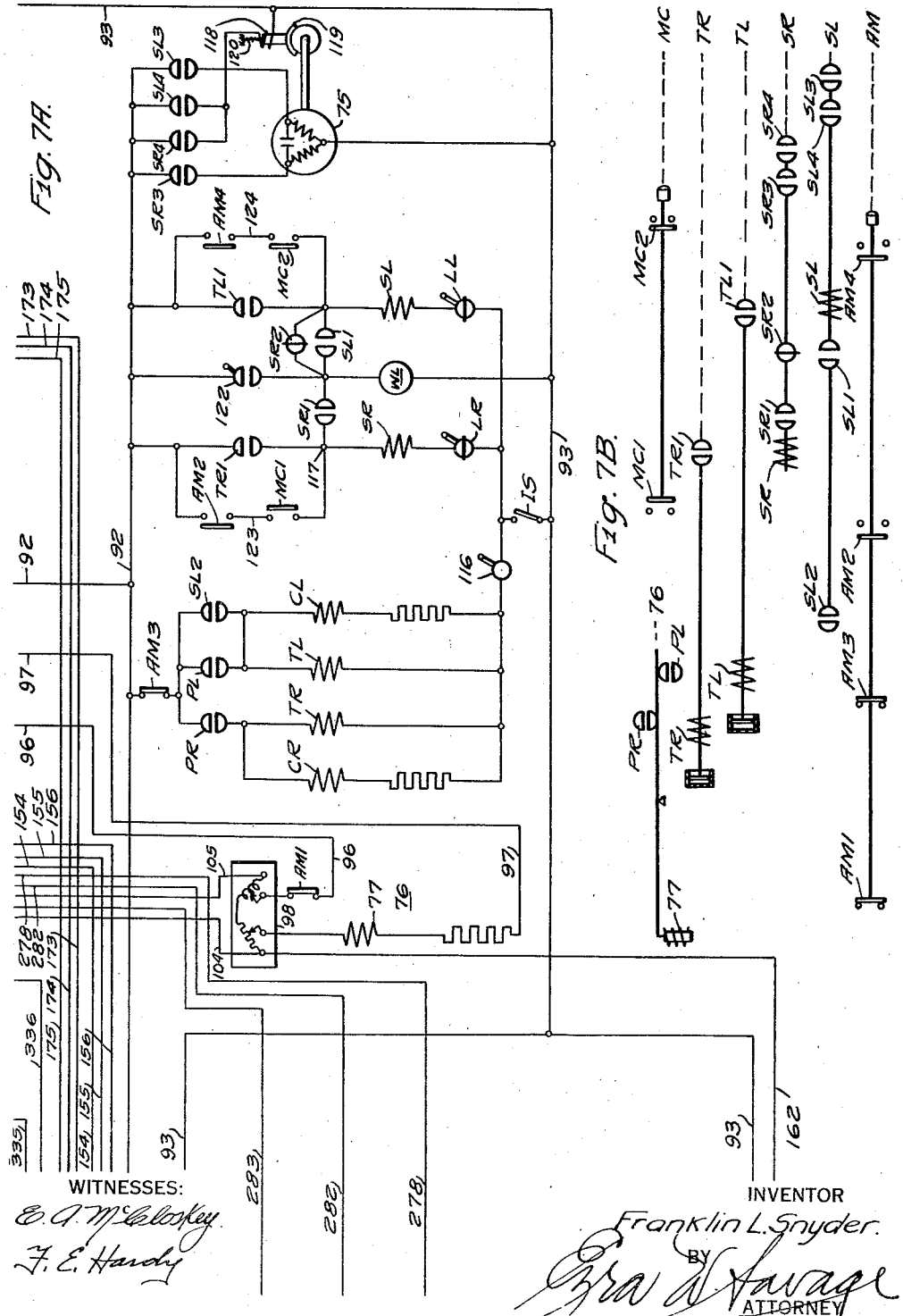

April 23, 1940.   F. L. SNYDER   2,198,489
POWER TRANSFORMER
Filed Dec. 23, 1937   10 Sheets-Sheet 9
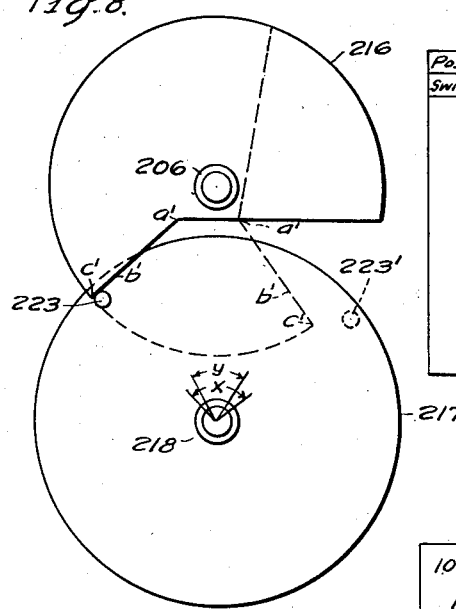
Fig. 8.
Fig. 9.
| Position | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Switch X-A | o |  |  |  |  |  |  |  |  |  |  |  |  |  |  |  | o |
| Y-A | o | o |  |  |  |  |  |  |  |  |  |  |  |  |  | o | o |
| X-B |  | o | o |  |  |  |  |  |  |  |  |  |  |  | o | o |  |
| Y-B |  |  | o | o |  |  |  |  |  |  |  |  |  | o | o |  |  |
| X-C |  |  |  | o | o |  |  |  |  |  |  |  | o | o |  |  |  |
| Y-C |  |  |  |  | o | o |  |  |  |  |  | o | o |  |  |  |  |
| X-D |  |  |  |  |  | o | o |  |  |  | o | o |  |  |  |  |  |
| Y-D |  |  |  |  |  |  | o | o |  | o | o |  |  |  |  |  |  |
| X-E |  |  |  |  |  |  |  | o | o | o |  |  |  |  |  |  |  |
| Y-E |  |  |  |  |  |  |  |  | o |  |  |  |  |  |  |  |  |
| J | o | o | o | o | o | o | o | o | o |  |  |  |  |  |  |  |  |
| K |  |  |  |  |  |  |  |  |  | o | o | o | o | o | o | o | o |
| L | o | o | o | o | o | o | o | o | o |  |  |  |  |  |  |  |  |
| M |  |  |  |  |  |  |  |  |  | o | o | o | o | o | o | o | o |
O = Switch Closed.
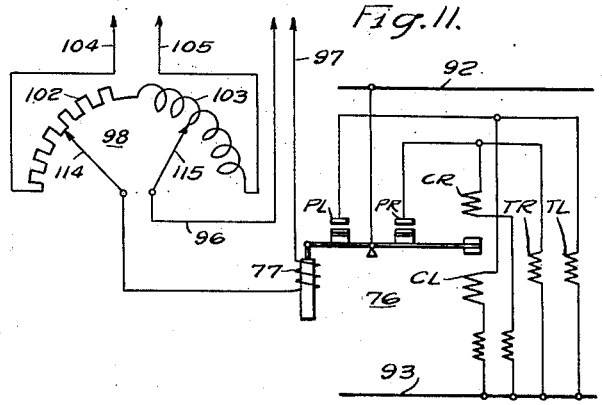
Fig. 11.
Fig. 10.
| Switch | CM1 | CM2 | CM3 | CM4 | CM5 |
|---|---|---|---|---|---|
| 1 Trip | o |  |  |  |  |
| 2 Off |  |  |  | o |  |
| 3 Operate |  | o |  |  |  |
| 4 Closed |  | o | o |  | o |
O = Switch closed.
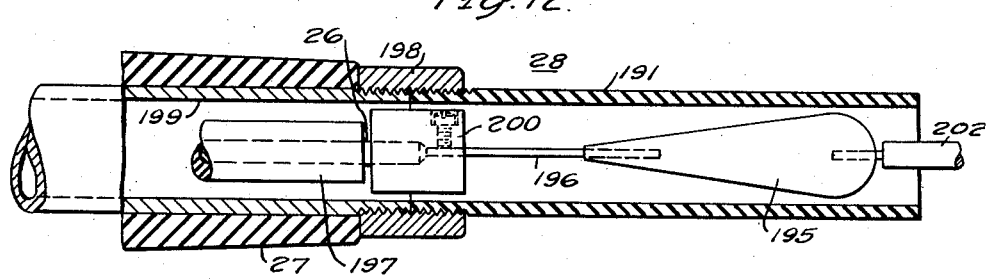
Fig. 12.
WITNESSES:
E. A. McCloskey.
F. E. Hardy
INVENTOR
Franklin L. Snyder.
BY Ezra W. Savage
ATTORNEY

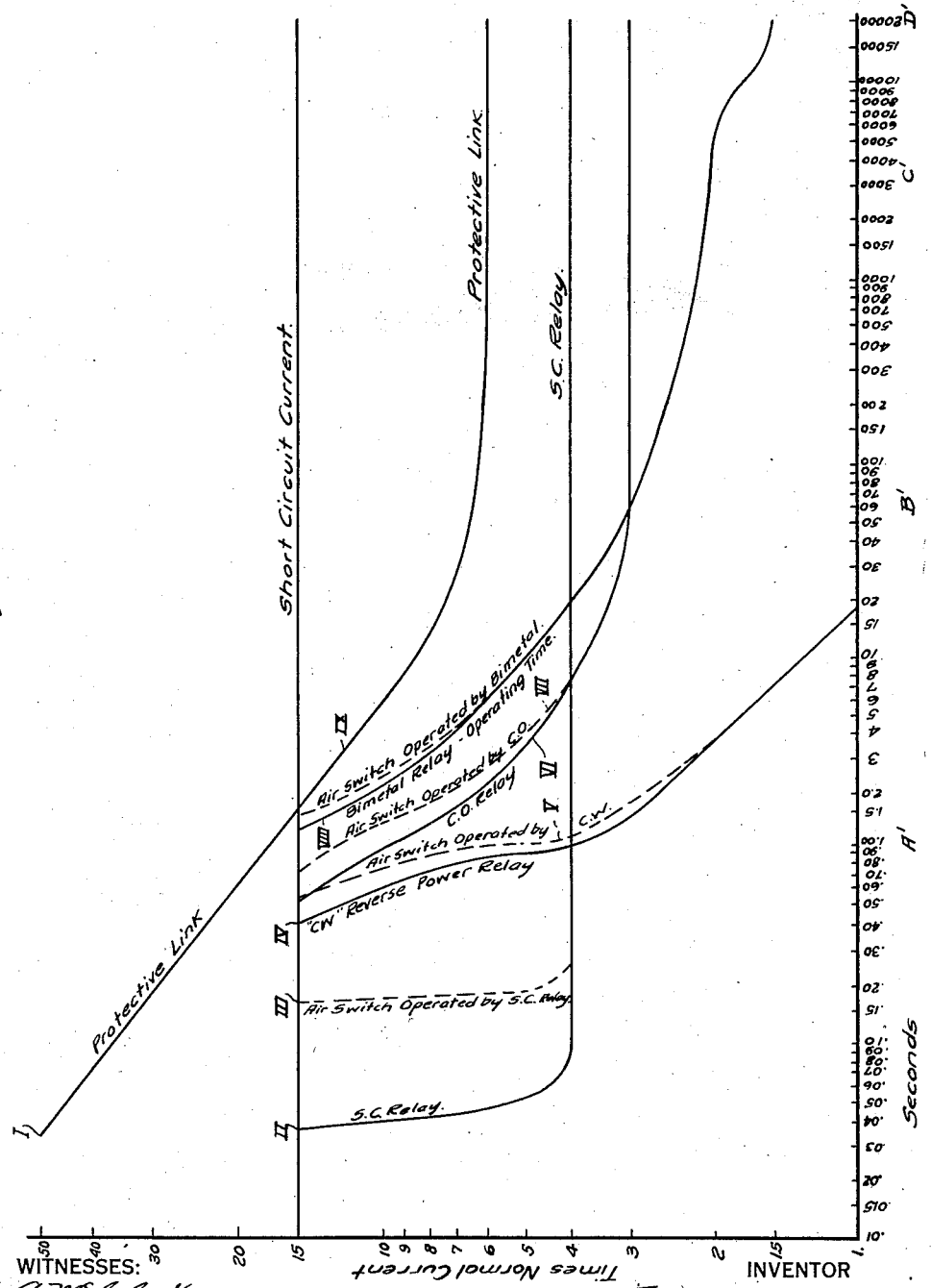

Patented Apr. 23, 1940

2,198,489

UNITED STATES PATENT OFFICE 2,198,489

POWER TRANSFORMER

Franklin L. Snyder, Sharon, Pa., assignor to Westinghouse Electric & Manufacturing Company, East Pittsburgh, Pa., a corporation of Pennsylvania Application December 23, 1937, Serial No. 181,380

25 Claims. (Cl. 175—294)

My invention relates to power transformer substation installations for use in polyphase power systems for stepping down the transmission line voltage to the feeder or primary distribution circuit voltage.

It is customary to provide substations in power systems for stepping down the transmission line voltage, which may be in the general range of from 22,000 to 110,000 volts, or higher, to a suitable voltage for use on the feeder or primary distribution circuit, which may be of the order of 16,000 volts or less, and from which value it is again stepped down to a secondary distribution circuit voltage for supply to the customer, the secondary distribution circuit voltage being in the order of 110 volts. The power transformer substations for supplying the primary distribution circuit are generally in the range of from 500 kva. capacity to 28,000 kva. capacity and employ three phase transformers provided with tap-changing equipment for voltage regulation, and also provided with lightning and over-load protective equipment. The distribution transformers for supplying the secondary or customer's supply circuit are usually single-phase transformers of much lower power capacity ranging from a few kilowatt capacity upward according to the customer's requirements.

It is necessary to protect the transformer insulation against damage from lightning surges, and also against damage that may be caused by abnormally high current on the primary distribution circuit, such as may be caused by a short circuit, a fault current, or by a continued high power consumption. Currents above normal full load value may be permitted for limited times depending upon their intensity. Those of high current value being permitted for short intervals of time only, while those of less current value may be permitted to continue for a longer time interval before it becomes necessary to interrupt the circuit. It is necessary to also protect the transformer from line to ground circuit faults, from single-phase or polyphase faults, and from internal short circuits within the transformer. The protective equipment may also include protection against reverse power flow from the low-voltage circuit to the high-voltage circuit which might occur in case the source of energy supply to the transmission line should become interrupted.

It is customary to provide a substation building for housing much of the electrical apparatus provided for a transformer substation, the several parts being distributed about the building over a considerable area. Such apparatus may include high-voltage lightning arresters and standard protective gaps for lightning protection on both the high-voltage and low-voltage terminals of the station, a high-voltage circuit breaker, a step-down, or main transformer, a tap-changing or regulating transformer automatically controlled to maintain the desired feeder voltage, a low-voltage circuit breaker, together with the automatic control equipment responsive to over-load conditions on the power circuit, and necessary metering and testing equipment.

It is an object of my invention to provide a power transformer substation installation of the character indicated in which all the necessary protective, metering, and regulating equipment are mounted within or on a single transformer tank or housing, thus eliminating the necessity for the usual substation building, and providing a more compact and economical substation.

It is a further object of my invention to provide a transformer installation of the above-indicated character in which the arrangement of the parts is simplified to provide a more efficient and economical substation.

It is a further object of my invention to so coordinate the elements of the protective system to insure the greatest protection to the apparatus with the least possible interruption of service.

Other objects and advantages of my invention will be apparent from the following description of one preferred embodiment thereof, reference being had to the accompanying drawings, in which:

Figure 1 is a diagrammatic illustration of the arrangement of the main parts of the apparatus generally employed in a substation of the character under consideration;

Figs. 2, 3, 4 and 5 are layout or outline views showing the arrangement of the several parts of my invention in one preferred embodiment thereof—Fig. 2 being taken along the line II—II of Fig. 3; Fig. 3 being a horizontal sectional view; Fig. 5 being a portion of a sectional view taken along the line V—V in Fig. 3; and Fig. 4 being a sectional view taken along the line IV—IV in Fig. 3;

Figs. 6, 6A, 7 and 7A when placed together with Fig. 7 to the right of Fig. 6, and Figs. 6A and 7A below Figs. 6 and 7, respectively, is a straight line diagrammatic view of the circuits and apparatus employed in the illustrated embodiment of my invention;

Figs. 6B and 7B are key figures showing the mechanical connection between the several contacts and their operating mechanisms that are shown in Figs. 6, 6A, 7 and 7A, respectively;

Fig. 8 is a detail of the operating cam mechanism employed in the circuit breaker illustrated in Figs. 4 and 5;

Fig. 9 is a sequence chart of the tap-changing switches shown in Fig. 6;

Fig. 10 is a similar chart of the manual switch CM, the several contacts of which are shown in Figs. 6A and 6B;

Fig. 11 is a simplified diagrammatic view of the tap-changer primary control relay together with its control circuits that are illustrated in straight-line diagram form in Fig. 7A;

Fig. 12 is a detail of the protective link mounted on the lower end of the high-voltage bushings as shown in Fig. 2; and Fig. 13 is a chart showing the time coordinated relation of the several control elements of the protective system.

Figure 1:
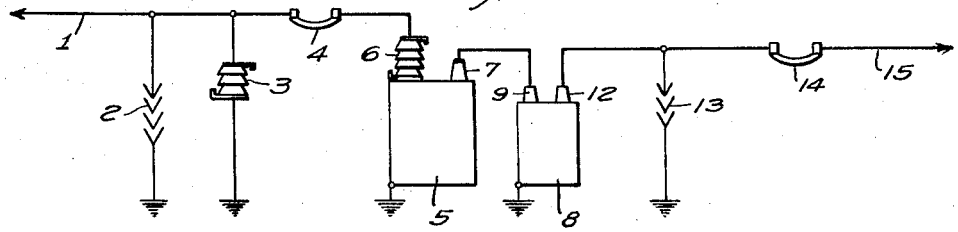

Referring to Figure 1, the usual transformer substation receives power from a high-voltage circuit represented by the line 1, between which and ground a lightning arrester 2 is provided, and between which and ground a standard protective gap 3 of higher breakdown voltage rating than the lightning arrester 2 is also provided for protecting the transformer in case of failure of the lightning arrester. The power circuit 1 is connected through a circuit breaker 4 to the high-voltage windings of a main step down transformer 5 having high-voltage terminals 6 and low-voltage terminals 7 that are connected to a regulating transformer 8 having bushings 9 and provided with a tap-changing mechanism to control the supply of power at a predetermined voltage through the conductor extending through the low-voltage bushing 12 to the distribution circuit 15. A lightning arrester 13 and a circuit breaker 14 are also provided on the low-voltage distribution circuit side of the transformer installation. It will be appreciated that Fig. 1 is diagrammatic only and that the lines 1 and 15, respectively, refer to power circuits generally constituted by three polyphase conductors having lightning arresters, protective gaps, etc., in each phase conductor. In addition to the major parts of the equipment illustrated in Fig. 1, automatic control equipment must be provided for operating the regulating transformer 8 and for operating the circuit breakers 4 and 14 under fault or overload conditions of the power circuit. This control mechanism is generally mounted on control panels within the substation building, together with metering equipment and test outlet terminals, all of which in my transformer installation are incased within a single transformer tank.

In the transformer installation in accordance with my invention, a single tank structure 16 is provided that is divided into four compartments, a power transformer compartment 17 that extends from the top to the bottom of the tank, and which contains a transformer structure equivalent to that contained in both the transformers 5 and 8 of Fig. 1, a chamber 18 containing the tap-changing equipment that extends across approximately one-half the front of the tank and from the top of the tank approximately halfway toward the bottom, a chamber 19 for the low-voltage circuit breaker switch that extends from the top of the tank approximately halfway toward the bottom across the remaining front portion of the transformer tank, and a control chamber 22 extending entirely across the front of the tank below the tap-changing equipment chamber 18 and the circuit breaker equipment chamber 19, and which contains the necessary control equipment for operating both the tap-changing mechanism and the circuit breaker mechanism.

Figure 3:
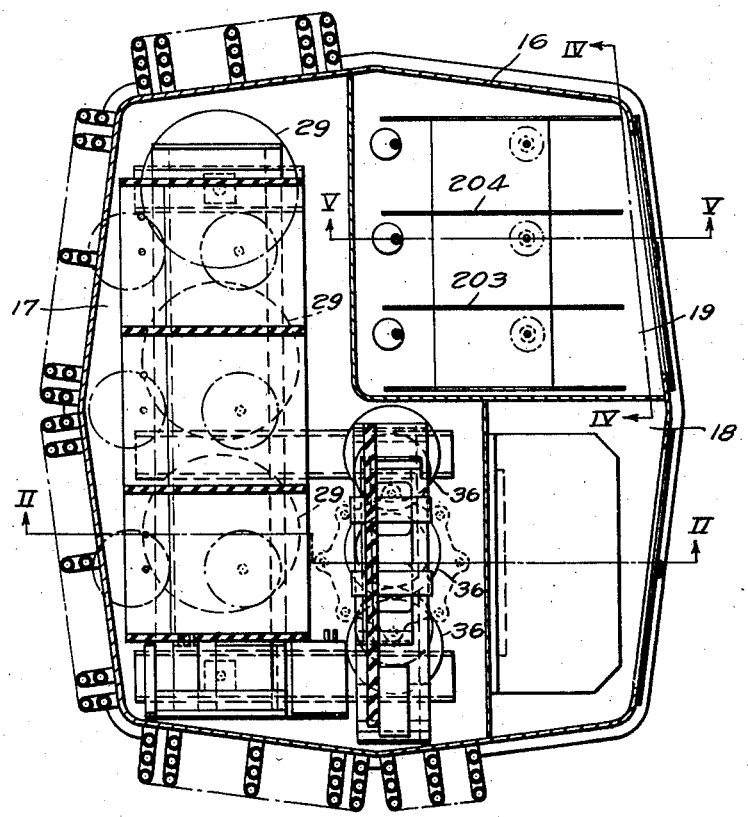

The high-voltage circuit breaker corresponding to that indicated at 4 in Fig. 1 has been omitted from my construction, and the bushings 3 providing the standard gaps have likewise been omitted as a separate piece of apparatus, the gap elements being added to the high voltage terminal bushings. The high voltage lightning arrester shown at 2 in Fig. 1 is usually a separate piece of apparatus mounted separately from the transformer proper. In my installation these arresters are mounted directly on the transformer tank as shown at 23, the high-voltage terminals represented by conductors H1 being connected directly to the terminals 24 of the lightning arresters, the lower terminals being grounded on the transformer tank. The conductor H1 is connected to a bushing stud 26 extending through the high-voltage bushing 27 into the transformer tank, and on the lower end of which is provided a protective link 28 shown in detail in Fig. 12, and connected to one phase of the high-voltage windings of the main transformer 29, which, as shown in Fig. 3, constitute three sets of inductively related windings corresponding to the three phases of a three-phase system. The other phase conductors H2 and H3 are similarly connected to the corresponding phase windings of the main transformer. Instead of providing a separate regulating transformer, as shown at 8 in Fig. 1, the low-voltage winding of the transformer 29 is provided with a plurality of tap connections 31, 32, 33 and 34, etc., which connect to tap switches A, B, C, D, etc., of the tap-changing mechanism indicated generally at 35 within the chamber 18, and which are connected through appropriate tap switches to the primary windings of a series transformer 36, the three-phase windings of which are mounted beside the transformer 29, as clearly shown in Figs. 2 and 3. The terminals from the low-voltage winding of the transformer 29 extend through bushings 37 (see Fig. 5) into the circuit breaker chamber 19, the circuit to the low-voltage circuit conductors being completed through the contact members 38 of the circuit breaker AS and through the bushing studs 39 of the low-voltage bushings 42 to the respective low-voltage circuit conductors L1, L2, L3. Lightning arresters 43 connected between each phase conductor of the low-voltage circuit and ground are mounted on top of the transformer tank beside the low-voltage terminal bushing 42. Auxiliary apparatus, such as current transformers 45, 46 and 47, an auxiliary transformer 48, preventive auto 49, potential transformers 52 and thermal relays 1BR, 2BR and 3BR are mounted on the main transformer frame and are removable therewith as a single unit.

Figure 6A:
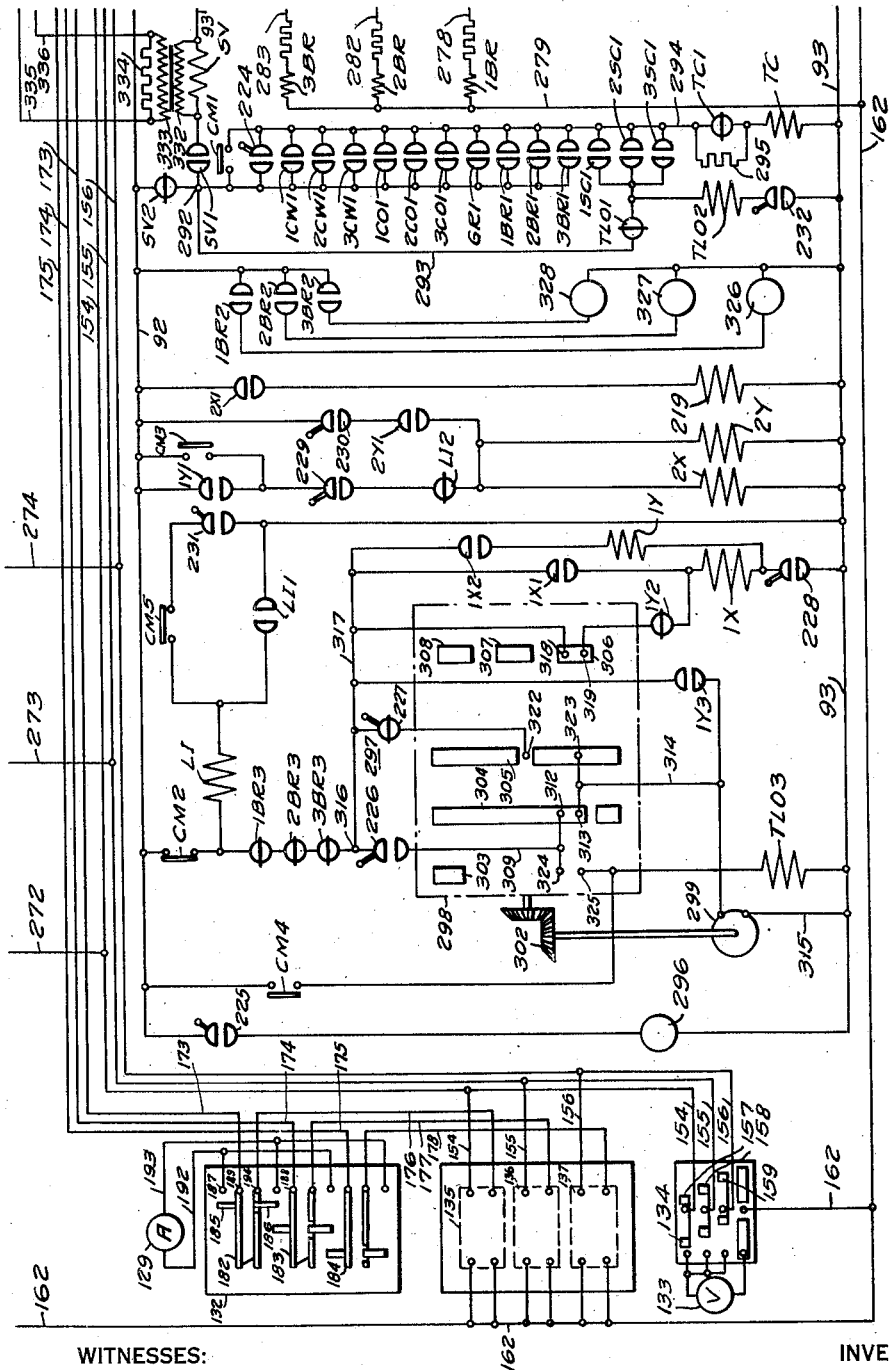

The ammeters, voltmeters and metering switches disclosed in Fig. 6A and the several control relays disclosed in Figs. 6, 6A, 7 and 7A with the exception of the thermal relays 1BR, 2BR and 3BR are mounted in the control chamber 22, as is also the equipment for providing an oxygen free atmosphere to the transformer, if used, indicated generally at 51.

The arrangement of the various parts of the apparatus and their control circuits will be best understood by reference to Figs. 6, 7, 6A and 7A which taken together constitute a single diagram when Fig. 7 is positioned to the right of Fig. 6 and Figs. 6A and 7A are positioned, respectively, below Figs. 6 and 7. Starting at the left of Fig. 6, the three phase conductors H1, H2 and H3 represent the three incoming transmission line conductors of a three-phase system, between each of which and ground the lightning arresters 23 are connected and in circuit with which the protective links 28 are connected. The three phase conductors H1, H2 and H3 are connected to supply energy to the high-voltage windings 53, 54 and 55 of the transformer 29, the three phase windings being illustrated as connected in delta and provided with manually operable no-load tap-changing switches 56, two such switches being provided in each phase winding. The low-voltage windings 57, 58 and 59 are inductively related to the high-voltage windings 53, 54 and 55, respectively, and are connected to a neutral point 62 through the secondary windings 63, 64 and 65, respectively, of the three-phase series transformer 36, the primary windings 66, 67 and 68 of which are connected to their respective low-voltage windings 57, 58 and 59 of the main transformer through tap-changing switch mechanisms to be later described. The terminals of the low-voltage windings 57, 58 and 59 are connected, respectively, to the low-voltage circuit conductors L1, L2 and L3 through the contact members 38 of the circuit breaker AS.

Tap-changing equipment

The no-load tap-changing equipment for the high voltage windings comprises the several switches 56 for changing the effective number of turns in the high-voltage windings 53, 54 and 55. They are manually operated under conditions of no-load on the transformer. The tap-changing or regulating equipment LTC for the low-voltage windings 57, 58 and 59 is automatically operated under load conditions for varying the voltage delivered to the circuit conductors L1, L2 and L3. The structural features of the particular mechanism employed for operating the regulating tap-changer equipment is not here illustrated and described in detail, as it may be any one of a number of known motor-operated tap-changing mechanisms, such as that disclosed in my Patent No. 2,036,305, issued April 7, 1936, for Regulating equipment, and assigned to the same assignee as this application. The circuits controlled by the tap-changing equipment are diagrammatically illustrated in Fig. 6. A plurality of taps a, b, c, d and e are provided on each of the low-voltage windings 57, 58 and 59 connected respectively to fixed switch contact members A, B, C, D and E, which cooperate with a pair of movable switch contact members X and Y that are connected, respectively, to the opposite ends of a tap-bridging auto-transformer or preventive auto 49. Reversing switches J, K, L and M are provided, the switches J and K being adapted to connect the middle point 69 of the preventive auto 49 to one of the conductors 72 or 73 that are connected to the opposite terminals of the associated phase primary winding 66, 67 or 68 of the series transformer 36. The reversing switches L and M connect a junction point 74 between the secondary winding of the associated phase of the series transformer and the low-voltage windings 63 and 57, for example, with the one or the other of the conductors 72 and 73.

By operating the switching mechanism in the sequence set forth in the table of Fig. 9, the voltage supplied to the distribution circuit conductors L1, L2 and L3 may be varied in a series of steps to buck or boost the normal induced voltage of the main transformer.

In the chart of Fig. 9, the presence of a circle in any square indicates that the switch contacts identified at the left thereof are closed and the absence of a circle indicates an open switch. The successive tap-changer positions are indicated at the top of the chart. Thus in the first position of the tap-changing equipment, which is indicated in the left-hand column of the chart of Fig. 9 under the numeral 1, the tap-changing switches X—A and Y—A are closed, as also are the reversing switches J and L, and all of the remaining switches of the equipment are in their circuit interrupting positions. In this position of the equipment, the whole of the winding 57 between the tap a and the junction point 74 is connected between the conductors 72 and 73 across the primary winding 66 of the series transformer 36 in a direction such that the voltage produced in the winding 63 increases the potential between the neutral point 62 and the line conductor L1. It will be understood that the tap-changing switch equipment for each of the three phases operate together and occupy like positions. To reduce the voltage supplied to the conductors L1, L2 and L3 one step, the tap-changing equipment is operated to the position shown at 2 in Fig. 9, in which the contact X is in engagement with the contact A, and the contact Y is in engagement with the contact B, thus, in effect, connecting the conductor 72 to the midpoint between taps a and b. The third step in the sequence connects the switch contact members X and Y both to the contact member B while the reversing switches J and L remain in their previous positions, thus eliminating that portion of the winding between taps a and b from supplying excitation to the series transformer, and, in effect, connecting the conductor 72 to the tap b. The preventive auto 49 prevents the flow of high currents between the switch contacts X and Y when in engagement with different contact members A, B, C, D and E as in position No. 2.

As the switching equipment operates in the sequence indicated in the chart of Fig. 9 from the first to the 17th position, it passes through the position 9, indicated in the center of the chart. It will be noted that in this position all of the reversing switches J, K, L and M are closed, as well as switches X—E and Y—E so that no excitation is supplied from the secondary windings 57, 58 and 59 to the series transformer 36. As the tap-changing equipment operates in the sequence represented by the chart in Fig. 9, from position 9 to position 17, an increasing number of tap sections of the winding is connected in a reversed direction than in the first eight positions of the chart, thus decreasing the voltage below that effected when no voltage is applied to the series transformer from the tapped windings of the main transformer. It will thus be seen that in the tap-equipment positions to the left of No. 9 in the chart, the natural voltage of the main secondary windings is boosted and in the positions to the right in the chart, the natural voltage is bucked.

The control relays and circuits for operating the load tap changer is shown in straight-line diagram form in Figs. 7 and 7A. Fig. 7B positioned directly below Fig. 7A is a key or explanatory diagram illustrating the connections between the operating and contact members of the several relay switches in Fig. 7A with their coils and contact members in substantial vertical alignment in Fig. 7B with the corresponding elements in Figs. 7 or 7A so that the relation between the coil and contact member of any relay or switch in the straight-line diagram may be readily determined. Similarly, when Figs. 6, 6A and 6B are placed in vertical alignment with Fig. 6 at the top and Fig. 6B at the bottom, the explanatory diagram of Fig. 6B illustrates the relation between the operating and contact parts of the several switches in the straight-line diagrams of Figs. 6 and 6A, the corresponding parts being in vertical alignment in Fig. 6B with their positions on the straight-line diagram of Figs. 6 and 6A.

The under load tap-changer equipment comprising the switches illustrated diagrammatically in Fig. 6 and operated in accordance with the sequence chart of Fig. 9 is operated in a well known manner by a motor 75 under the control of a primary relay 76 (Figs. 7A and 11), the operating coil 77 of which is energized in accordance with the voltage appearing on the secondary winding 78 of a potential transformer 79 (Fig. 7), the primary winding 82 of which is connected between the line conductor L3 and ground at 83.

In order to provide a source of electrical energy for operating the several control relays, an auxiliary transformer AT is provided having a primary winding 84 connected between the line circuit conductor L3 and ground at 85, the secondary winding 86 of which is connected through the contacts of a safety switch 87, the contact members 88 and 89 of a double-throw switch DTS to the supply conductors 92 and 93, respectively. The double-throw switch DTS is also provided with contact members 94 and 95 which are in their closed circuit positions when the contact members 88 and 89 are closed, to connect the secondary winding of the potential transformer 79 by conductors 96 and 97 to the winding 77 of the primary control relay through a compensating device 98 of any well known construction for compensating the operation of the tap-changing mechanism in accordance with the load current in the supply circuit. The compensator is shown diagrammatically in Fig. 11 as constituting a resistor element 102 and a reactor element 103 connected in series to conductors 104 and 105, that are energized from a loop circuit including the secondary windings 106, 107 and 108 of the current transformers 109, 112 and 113, respectively, associated with the three distribution circuit conductors L1, L2 and L3. Contact members 114 and 115 are provided for varying the degree of compensation required in a well known manner.

If the voltage on the primary distribution circuit drops below the desired value for which the control relay 76 is set, the energization of the relay winding 77 will be decreased sufficiently and cause the relay contact members PR to be brought into engagement and close a circuit from the supply conductor 92 through the closed contact AM3 of an automatic transfer switch AM, the parallel connected primary relay compounding coil CR and the coil TR of a time delay relay, through a cam switch 116 interlocking switch IS to the supply conductor 93. The compounding coil acts as best shown in Fig. 11, on the armature of the relay 76 to hold the contacts PR in engagement until the tap-changing mechanism is operated sufficiently to cause a definite change in the voltage applied to the primary winding 77. The timing relay TR, on being energized, closes its contact members TR1, after a short time interval closing a circuit from the supply conductor 92 through junction point 117, the coil SR of a secondary relay, cam limit switch LR, and the interlocking switch IS to supply conductor 93. The energization of the winding SR causes the secondary relay to operate to close contacts SR1, SR3 and SR4 and open contacts SR2. The closing of the contacts SR4 energizes the brake winding 118 to release the brake 119 normally held set by a spring 120, and the closing of the contacts SR3 energizes the motor 75, which may be of the split-phase type to operate the tap-changing mechanism LTC in a direction to raise the voltage on the primary distribution circuit. After the motor 75 starts to operate, a cam actuated thereby closes the cam switch 122 which together with the closed contacts SR1 seal in the relay SR against opening until the motor 75 has made the necessary number of revolutions to bring the tap-changing switches to the next tap-changing position as shown on the chart in Fig. 9. Soon after cam switch 122 closes, cam switch 116 opens to permit the timing relay TR to reset to its deenergized position. When, after the motor is started, the next tap-changing position of the mechanism is approached, the cam switch 116 again closes after which the cam switch 122 opens. A signal light indicated at WL is energized simultaneously with the starting of the motor 75 and is maintained energized until the cam switch 122 opens, the signal light indicating that the tap-changing mechanism is in its "off" position. If for any reason the tap-changing mechanism fails to complete its cycle of operation from one tap-changing position to the next, this condition is indicated by the signal light WL. Upon the opening of the cam switch 122, the relay SR is deenergized, opening its contacts SR1, SR3 and SR4 to extinguish the light WL, stop the motor 75, and apply the brake 119 until again actuated by operation of the primary relay 76. The cam switch LR is provided to interrupt the circuit through the coil of the relay SR when the tap-changing mechanism has reached the limit of its voltage lowering position to thus interrupt the operation of the motor 75.

If the voltage on the distribution system rises above its desired value, the energization of the primary relay winding 77 increases and causes engagement of the relay contact members PL which closes a circuit through the compounding coil CL and the winding of the time delay relay TL, the compounding coil holding the contact members PL in positive engagement until an appreciable change occurs in the voltage applied to the winding 77, and the relay TL operating, after a time interval, to close its contacts TL1. The closing of the contact members TL1 energizes the winding of the relay SL to cause the several relay contact members SL1, SL2, SL3 and SL4 to close. The contact SL4 energizes the brake winding 118 to release the brake, and the contact SL3 supplies energy to the motor 75 to rotate it in a direction to operate the tap-changing equipment to lower the voltage on the distribution system. The cam switch 122 which closes immediately after the motor starts to operate, completes a "seal in" circuit through contact member SL1 and the limit switch LL until the next tap switch position of the mechanism is reached, the cam switch 116 opening during the operation of the motor and closing when the next tap position of the mechanism is nearly reached to permit a resetting of the timing relay TL in the same manner as above described for the relay TR. The limit switch LL is cam operated to its circuit interrupting position when the tap-changing mechanism has reached its limit of operation in a voltage lowering direction. The light WL is illuminated upon the closing of the cam 122 upon operation of the tap-changing mechanism in either direction.

The contact SL2 which closes upon energization of the relay winding SL holds the circuit through the timing relay winding TL closed to prevent opening of the tap changing motor circuit during the short interval of time between the closing of the TL relay and the closing of cam switch 122 which might be caused if the primary relay contacts PL open during this period, due, for example, to a reduction in voltage caused by the starting of the tap changing motor. After the cam switch 122 closes the tap changing motor will continue to operate to the next tap position of the mechanism independently of contacts PL and SL2, or until the circuit is interrupted by cam switch 116.

The contacts SR2 shown closed when the relay SR is unenergized prevents the tap changing mechanism from locking open between tap positions in case power fails during a tap changing operation. If power fails, the holding circuit through contacts SL1 and relay winding SL becomes dead, permitting the relay SL to open. This relay picks up again by the circuit through contacts SR2 when power comes on again.

If, for any reason, it is desired to operate the tap-changing mechanism manually instead of automatically, the switch AM is operated to its second circuit closing position interrupting the circuits through the contacts AM1 and AM3, and closing the contacts AM2 and AM4. The contacts AM1 and AM3 now prevent the flow of current to the primary relay 76 or to the timing relays TR and TL, and closing the contact members AM2 and AM4 closes one point in each of two circuits through conductors 123 and 124, respectively, which are completed by the closing of a contact member MC1 or MC2 of a manual control switch ML which closes circuits in shunt relation to the contacts TR1 and TL1, respectively, for operating the tap changer in a voltage raising or voltage lowering direction. The completion of the operation of the motor from one tap-changing step position to the next is controlled automatically in the same manner as when the motor is starting under the control of the primary relay 76. The double-throw switch DTS, in addition to the contact members 94, 95, 88 and 89, which are all closed in one position of the switch, is provided with contact members 125, 126, 127 and 128 which are all closed in a second position of the switch. When the switch DTS is in a position to close the upper row of contact members last-named, the supply conductors 92 and 93 are connected through the switch contacts 127 and 128, respectively, to an external source of energy supply.

Metering equipment

The metering equipment includes a standard ammeter 129 with a transfer switch 132 for measuring the current in any one of the three phases of the distribution circuit, a voltmeter 133 with a transfer switch 134 for measuring the voltage in any one of the three phases, and wattmeters 135, 136 and 137 for measuring the power in each of the three phases. The meters may be standard apparatus. Three potential transformers 142, 143 and 144 are provided associated with the three phase conductors L1, L2 and L3, respectively, the primary windings 145, 146 and 147 thereof being connected between their respective circuit conductors and ground, and the secondary windings 148, 149 and 152 thereof being connected together at a grounded neutral point 153 for supplying phase voltages to conductors 154, 155 and 156 that are connected, respectively, to the three switch elements 157, 158 and 159 of the voltmeter 133 to complete a circuit from a selected one of the three voltage phase conductors through the voltmeter 133 and conductor 162 and through junction point 163 to the neutral point of the star connected potential transformer secondary windings. The voltage elements of the wattmeters 135, 136 and 137 are likewise connected, respectively, between the potential transformer phase conductors 154, 155 and 156 and the return neutral conductor 162.

Metering current transformers 164, 165 and 166 are provided, respectively, in the distribution circuit conductors L1, L2 and L3 having secondary windings 167, 168 and 169 that are connected through junction point 172 to ground and to the neutral return conductor 162, the several phase conductors 173, 174 and 175 of which are connected through the contact members of the transfer switch 132 and the current element of the wattmeters 135, 136 and 137, respectively, to the neutral return conductor 162. When it is desired to connect the ammeter 129 to read the current in one of the phase conductor windings, the transfer switch 132 is moved to a position such that one of the sets of conducting segments represented generally at 182, 183 and 184, operate to introduce the ammeter 129 in the appropriate phase measuring circuit. For example, if the transfer switch is moved to such a position that the conducting fingers 185 and 186 engage, respectively, the contact members 187 and 188, the circuit through the ammeter is completed from conductor 173, contact member 189, conducting segment 185, contact member 187, conductor 192, ammeter 129, conductor 193, contact member 188, conducting segment 186 and contact member 194 to conductor 176 through the current element of the wattmeter 135 to the neutral return conductor 162. It will be noted that the conducting segment 185 is integral with the conducting segments 182 and that the finger 186 is insulated from the conducting segments 182. By similar movements of the transfer switch 132, the ammeter 129 may be connected in circuit with the phase conductor 174 and conductor 177 in series with the current element of the wattmeter 136 to the neutral return conductor 162, or between phase conductor 175 and conductor 178 in series with the current element of the wattmeter 137 to the neutral return conductor 162.

Protective equipment

The protective equipment, in addition to the lightning arresters and protective gaps before mentioned, includes the protective links 28 positioned as indicated in Fig. 2 on the inner ends of the high-voltage bushings 27, the circuit breaker AS having contact members 38 positioned in the circuit breaker compartment 19, and control equipment for the air switch that is responsive to the various circuit conditions under which it is desired that the switch open.

The protective link is designed to protect the transformer against internal faults such as short circuits within the transformer tank between parts of the transformer winding, or to interrupt the circuit in case the thermal relays 1BR, 2BR or 3BR, and the other protective relays controlling the opening of the circuit breaker AS fail to operate. The protective link is connected in circuit with the high-voltage conductors supplying energy to the high-voltage windings of the transformer and may be of any suitable construction employing a fuse element that is heated by an excess of current flowing therethrough and will correspond in principle to the disclosure in a copending application of J. K. Hodnette, Serial No. 167,040, filed October 2, 1937, for Protective devices for electrical apparatus and systems, assigned to the same assignee as this application. The protective link is best shown in Fig. 12 and comprises a fibre tube 191 enclosing a pellet 195 and a fusible wire 196 connected between the pellet and the conductor of an insulated cable 197 that extends through the central opening in the bushing 27. A connecting block 198 is provided for connecting the fusible wire 196 to the cable. A brass collar 200 is provided for coupling the fibre tube 191 with a tube 199 extending through the bushing 27. The lower end of the pellet 195 is connected to the conductor of an insulated cable 202 which passes beneath the oil to the high-voltage windings of the transformer. A protective link of the character described is provided on each of the three bushings between each of the three high-voltage circuit conductors H1, H2 and H3 and the associated phase windings of the main transformer. When the current passing through the fusible wire 196 becomes greater than the current carrying capacity of the wire, the wire melts causing an arc to be formed between the two parts thereof, generating gases which act on the pellet 195 to force it out of the tube 191 with a high velocity. This rapid expulsion of the pellet from the tube lengthens the arc rapidly and draws it into the main body of oil, thus quenching the arc in a few cycles. It will be noted by reference to Fig. 2 that the protective link 28 is positioned beneath the surface of the oil in which the several parts of the transformer equipment is immersed in the chamber 17.

*Circuit breaker*

Figure 4:
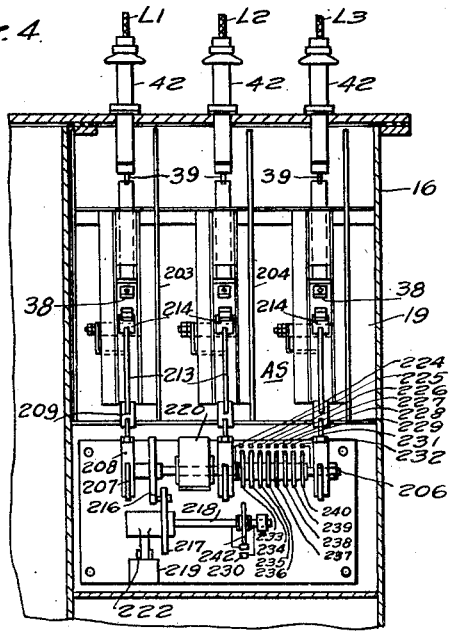
Figure 5:
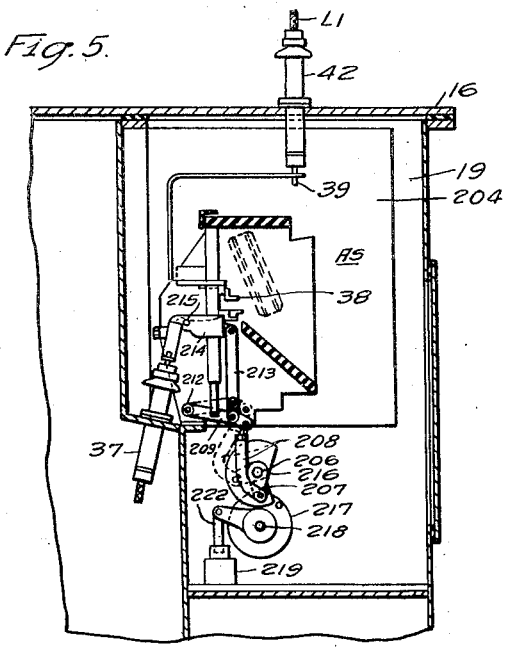

The circuit breaker employed in this assembly may be any suitable circuit breaker adapted for operation to suit the service required and may be either motor-operated or solenoid operated. The circuit breaker is provided with a number of cam switches that interlock its functioning with the breaker control system hereinafter described. Referring to Figs. 4 and 5, three pairs of contact members for interrupting the current through each of the three phases of the system are provided which may be separated by appropriate barriers 203 and 204, and each of which are controlled by a like mechanism in accordance with the movement of a shaft 206 carrying a crank arm 207, which when moved clockwise, as viewed in Fig. 5, raises the rods 208 from their full-line to their dotted-line positions, moving the links 209 upwardly about fixed pivot points 212 and raising the lift rods 213 carrying the lower one of the switch contact members 38 upwardly to engage the upper switch contact member. The lower contact member 38 is spring mounted in a well known manner on the contact arm 214 that is adapted to pivot about the pin 215. A cam 216 is provided connected on the shaft 206 and cooperates with a cam 217 carried by a shaft 218 that is rotated by a closing solenoid 219 to operate the switch to its circuit closing position. The switch may be held in its circuit closing position by a spring actuated brake 220 that is normally held in its set or brake applying position by a spring (not shown) released, in a well known manner, upon the energization of a brake winding or trip coil TC shown in Fig. 6A which will be more fully described at a later time. A latch may be substituted for the brake and held in its latched position by a spring and moved to its unlatched position by a magnet. The trip coil for tripping the latch need not be maintained energized after release thereof.

The operation of the circuit breaker cams 216 and 217 will be better understood by reference to Fig. 8 in which the cams are shown in their full-line position just prior to the end of the closing cycle of operation. The dotted lines show the position of the cams when the circuit breaker is open, the pin 223 carried by the cam 217 being shown in dotted lines at position 223'. Upon the energization of the operating solenoid 219 (Figs. 4 and 5), the arm 222 connected thereto rotates the shaft 218 in a counterclockwise direction, causing the pin 223 to engage the cam surface 216 in the dotted-line position between the points a' and b' in Fig. 8 to rotate the cam 216 in a clockwise direction, thus raising the lift rods 208 and bringing the lower contact members 38 into engagement with the upper contact members. When the cam 216 is in the substantially closed position of the circuit breaker during which the pin 223 passes from the point b' to the point c' on the surface of the cam 216, the cam switch 224 opens, deenergizing the coil TC of the brake 220 and applying the brake to the shaft 206 to maintain the switch in its circuit closing position. When a latch is used instead of a break, the switch 224 may be omitted since it is not necessary to maintain the trip coil TC energized after the latch has been moved to its unlatched position. It will be noted that during the movement of the pin 223 from point b' to point c' on the surface of the cam substantially no motion of the shaft 206 takes place. Cam operated switches 224, 225, 226, 227, 228, 229, 231 and 232 are provided to be actuated by cams 233 to 240, respectively, carried by the shaft 206. Cam switches 224, 225, 226, 228, 229, and 232 are open when the circuit breaker AS is closed and closed when the circuit breaker is open, and cam switches 227 and 231 are closed when the circuit breaker is closed and open when the circuit breaker is open. A cam switch 230 is also provided, that is actuated by a cam 242, carried by the shaft 218, and is closed during a portion of the movement of the shaft 218 to close the circuit breaker. It will be noted by reference to Figs. 4, 5 and 8 that upon the completion of the closing operation above described and the subsequent deenergization of the closing coil 219, the cam 217 and shaft 218 return immediately to the position in which the pin 223 is shown in dotted outline at 223'. The cam 217, therefore, does not interfere with the opening of the circuit breaker which takes place immediately upon the energization of the tripping coil TC to release the brake 220 and to effect the opening of the breaker due to the combined force of throw-out springs and gravity action upon the movable mechanical parts.

*Circuit breaker control equipment*

The circuit breaker control equipment for effecting operation of the circuit breaker AS is arranged to open the switch upon either overload current, high temperature on the transformer, excessive ground current or reverse power flow in the system. An automatic reclosing circuit breaker equipment is provided that is operative in response to any of the faults above enumerated excepting the thermal overload in which the reclosing operation is prevented. Manual control of the circuit breaker is also provided. Substantially instantaneously operated overcurrent relays 1SC, 2SC and 3SC are provided to be responsive, respectively, to overload currents of a predetermined value in each of the three low voltage phase conductors. These relays may be of the type known to the trade as "Type SC" relays of Westinghouse Electric & Manufacturing Company manufacture which have a plunger contact having a definite operating time for any current higher than the trip setting of the relay. Three inverse time relays 1CO, 2CO and 3CO are also provided for overload tripping operation which may be what is known to the trade as the "Type CO" relay of Westinghouse Electric & Manufacturing Company manufacture, the inherent characteristic of which is that it operates at varying intervals of time depending upon the intensity of the overload current, slower for low overload currents and faster for larger current values. The Type CO relays may be set to operate at a lower ultimate current value as shown in curves in Fig. 13 in which the CO relays operate at any current value above three times normal at varying time intervals, and the SC relay is indicated in that figure as operating substantially instantaneously for any current values above four times normal full load current. Three reverse power relays indicated as 1CW, 2CW and 3CW are also provided for the three phase conductors L1, L2 and L3, respectively, for opening the circuit breaker AS upon a reverse power flow of some predetermined value, say 10% normal full load, in any one of the three phases of the system. An overcurrent relay GR is also provided connected to the secondary winding 246 of a "ground" transformer, the primary winding of which is connected between the neutral point 62 and ground at point 248. The relay GR is effective to open the circuit breaker AS for some predetermined value of neutral to ground current determined by the setting of the relay. The several SC, CO and CW type relays are energized from circuits extending from the secondary windings 252, 253 and 254, respectively, of the current transformers 113, 112 and 109, one end of each of these windings being connected through junction point 255 to the above-mentioned neutral return conductor 162, the opposite ends thereof being connected to separate phase conductors 256, 262 and 266, respectively. A circuit from the secondary winding 252 of the current transformer 113 associated with distribution circuit conductor L1 extends from one terminal of the winding 252 through phase conductor 256, the winding of relay 1SC, conductor 257, the winding of relay 1CO, conductor 258, the current winding of the reverse power relay 1CW, conductor 259 and to the neutral return conductor 162 back to the opposite terminal of the secondary winding 252. A circuit from the secondary winding 253 of the current transformer 112 associated with the distribution line conductor L2 extends from one terminal of the winding 253 through conductor 262, the winding of relay 2SC, conductor 263, the winding of relay 2CO, conductor 264, the current winding of relay 2CW, conductor 265 to the neutral return conductor 162, and back to the opposite terminal of the secondary winding 253. A circuit from the secondary winding 254 of the transformer 109 associated with the distribution circuit conductor L3 extends from one terminal of the winding 254 through conductor 266, the winding of the relay 3SC, conductor 267, the winding of relay 3CO, conductor 268, the current winding of the relay 3CW, conductor 269 to the neutral return conductor 162 back to the opposite terminal of the winding 254. The reverse power relays CW each have a current winding connected as above described, and a voltage winding, the voltage winding of the relay 1CW being connected between the neutral return conductor 162 and conductor 272 that is connected through the voltage phase conductor 154 to the secondary winding 148 of the potential transformer 142 associated with line conductor L1 as above described. The voltage winding of the reverse power relay 2CW is connected between the neutral return conductor 162 and conductor 273 that is connected through the voltage phase conductor 155 to the secondary winding 149 of the transformer 143 associated with line conductor L2. The voltage winding of the reverse power relay 3CW is connected between the neutral return conductor 162 and conductor 274 with the voltage phase winding 156 leading to the secondary winding 152 of the potential transformer 144 associated with the distribution circuit conductor L3. It will be noted that each of the three relays 1SC, 1CO and 1CW are associated functionally with conditions in one phase of the three phase circuit. the three relays 2SC, 2CO and 2CW are associated with the second phase of the three phase circuit, and the three relays 3SC, 3CO and 3CW are associated with the third phase of the three phase circuit. The operation of any one of these relays initiates the opening of the circuit breaker AS and starts the operation of a reclosing circuit breaker mechanism, the operation of which will be presently described.

In addition to the above enumerated relays, thermal relays 1BR, 2BR and 3BR are provided, the location of which is shown in Fig. 2 as being below the surface of the transformer oil. These thermal relays are responsive to the combined temperature of the oil and the temperature of the heating coils 1BR, 2BR and 3BR shown in Fig. 6A, and which are heated in accordance with the current flowing respectively in the three phase conductors L1, L2 and L3. The thermal relays may be of the type known to the trade as "Type TR" Westinghouse circuit breakers. Each of the three current transformers 113, 112 and 109 is provided with a secondary winding 275, 276 and 277, respectively, the three windings being connected to the before mentioned neutral return conductor 162 at the junction point 255. The winding 275 is connected by conductor 278 through the heating coil 1BR, conductor 279 to the return neutral conductor 162. The current transformer secondary winding 276 is connected by conductor 282 through the heating coil of the thermal relay 2BR, and conductor 279 to the neutral return conductor 162, and the current transformer secondary winding 277 is connected by conductor 283 through the heating coil of the thermal relay 3BR, conductor 279 and return neutral conductor 162. The several thermal responsive elements of these several relays are heated both by the transformer oil and by their respective heating coils which respond to the current flowing through their respective phase conductors.

Before describing the operation of the circuit breaker in response to the several control relays, it will be helpful to note the coordinated relation in timing between the several circuit-interrupting control elements as shown on the chart in Fig. 13, in which the vertical axis represents current values in times normal current from 1 to 50, that is, from normal current to 50 times normal current, and the abscissa represents time in seconds. It will be noted that the scale used is a logarithmic scale, and that the distance from the left of the chart to the point A' is expressed in hundredths of a second. The point A' indicates a time of one second, the point B' represents sixty seconds or one minute, point C' thirty-six hundred seconds or one hour, and the point D' twenty-thousand seconds or approximately five and one-half hours. The curve I indicates the time required to fuse the protective link for current values of from fifty times normal down to approximately six times normal, lesser currents not being sufficient to fuse the link. In the example illustrated in the chart, it is assumed that short-circuit current is fifteen times normal current. The curve II indicates the time required for one of the "SC" type relays to operate, and the curve III the time of opening of the circuit breaker AS when opened by one of the "SC" type relays. It will be noted that the "SC" relays open substantially instantaneously for all values of current between short-circuit current down to four times normal full-load current. If the current in the feeder circuit is sufficient to trip an "SC" relay, it will do so in a few hundredths of a second regardless of the particular current value. The curve IV indicates the time required to operate any one of the reverse power relays "CW," and the curve V indicates the time of opening the switch AS when tripped by one of the reverse power relays. The curve VI indicates the time of operation of any one of the "CO" type overcurrent relays, and the curve VII indicates the time of opening the circuit breaker by any of these relays. The curve VIII indicates the time of operating of any of the thermal relays BR, and the curve IX the time of opening the primary circuit by the protective link.

It will be noted that the "CO" type relay causes an opening of the circuit breaker AS at varying times depending upon the current values, these varying from something less than one-half a second for short-circuit current to nearly a minute for a current of three times normal value, below which value the relay does not trip. The thermal relays, as indicated in curve VIII, will trip at a variable time shown as slightly over one second for short-circuit current to approximately one minute for three times normal current, and that these relays will trip the circuit breaker for lesser degrees of current down to 50% overload or 1.5 times normal current at approximately five and one-half hours.

It will be noted that for comparatively low overload current values, the overload will be carried a substantial interval of time before the thermal relay trips the breaker to prevent too great heating of the transformer. It will also be noted that any of the "CO" type relays within the range of current values controlled thereby will trip prior to the thermal relay, and that the "CO" relay will trip the breaker for lower values of current than will the "SC" relay. It will also be noted that the "SC" type relay, for the current values controlled thereby, will trip the circuit breaker switch prior to any of the other relays.

Likewise it will be noted that the protective link is the last one of the several circuit interrupting devices to be operated and will, therefore, operate only upon the failure of all the several other protective relays to operate, or upon the existence of a short circuit within the transformer such as between the windings thereof, which short-circuit current will flow through the protective link and the high-voltage conductors, but will not flow through the low-voltage conductors to which the several control relays are responsive. For overload current values between three and four times normal full load current, the circuit breaker switch AS will remain closed an appreciable time until one of the "CO" type relays operate to trip the switch.

It is evident from the above discussion that the various relays and protective equipments are so coordinated that the apparatus is completely protected under different types of fault conditions. The basic consideration in protecting the transformer against overload current is determined by the thermal characteristics of the apparatus which fixes the operating curve of the thermal relays. The protective link is so designed that it operates only in case the thermal relays fail or there is an internal fault in the transformer. The type "SC" relay has a very rapid operating time characteristic and is only used for initial operation of the circuit breaker exceeding above four times normal current. Subsequent opening, where a plurality of reclosing operations are provided for in response to the original fault, is controlled by the "CO" relays which also initiate the control for current values below four times normal value, and are timed to operate the circuit breaker switch before the transformer temperature reaches a value sufficient to effect operation of the thermal relays. The type "CW" relays operate only on reverse power flow such as might be effected only where the primary circuit supply is interrupted and a feedback of power through the transformer occurs. The "CW" relays are designed to operate to interrupt the circuit breaker AS for reverse power above 10% normal full-load power. It will be appreciated that the particular current values indicated in the chart of Fig. 13 are illustrative only and that the several relays may be set to operate at different values depending upon the requirements of particular installations. The coordinated relation in the chart respecting the relative times of operation of the several control elements would, however, be maintained.

Referring to Figs. 6, 6A and 6B, and assuming that a fault occurs on the distribution feeder of sufficient value to cause the operation of one of the "SC" type relays, for example, relay ISC. This relay would close its contacts indicated as ISCI on Fig. 6A, closing a circuit from the supply conductor 92 through the closed contact SV2 of the relay SV, the function of which will be later explained, to junction point 292, conductor 293, the relay contact member TLO1, the relay contact member ISCI, conductor 294, the tripping coil contact member TCI, the tripping coil TC of the brake 220, to the supply conductor 93, thus releasing the brake 220 and permitting the circuit breaker switch to open as above described. Upon the release of the brake, the contact members TCI are separated thus inserting a resistor 295 in series with the tripping coil TC to decrease the continued energization thereof to a value sufficient to maintain the brake in its released position while decreasing the heating effect thereon.

The overload current causing the relay ISC to initiate the operation of the circuit breaker switch AS is interrupted upon the opening of the switch, which causes the several cam switches 224, 225, 226, 228, 229 and 232 to be operated to their closed positions and the cam switches 227 and 231 to be operated to their circuit interrupting positions. The cam switch 230 is closed during a portion of the movement of the shaft 218 in a closing direction for a purpose to be later explained. The cam switch 224 in closing maintains a circuit between junction point 292 and conductor 294 in shunt relation to the relay contact member ISCI to insure that the energization of the tripping coil TC is maintained until the circuit breaker is again closed, thus maintaining the brake in its released position to permit closing. The cam switch 225 closes a signal circuit to a lamp 296 indicating that the circuit breaker switch AS is in its circuit interrupting position. The cam switch 232 closes a circuit from junction point 292, through conductor 293, toggle relay contact member TLO1 and coil TLO2 of the toggle relay to operate the relay to open its contacts TLO1, this relay being a toggle relay remains in its last established position until a second coil TLO3 thereof is energized upon the completion of the operation of the reclosing circuit breaker mechanism in a manner to be later explained. The opening of the toggle relay contacts TLO1 prevents an immediate second energization of the trip coil TC after closing the circuit breaker switch AS, which might occur in case the fault causing the first opening of the switch did not clear upon the first opening of the circuit breaker.

The reclosing circuit breaker mechanism employed as a part of the protective equipment causes an immediate reclosing of the circuit breaker after its initial opening by any one of the "SC" type relays in a manner to be shortly explained, the subsequent reopening of the switch in case the fault is not cleared by the first opening being controlled by the type "CO" relays which open only after the fault has continued for a predetermined time as indicated in the chart in Fig. 13, thus the first opening and first closing of the circuit breaker resulting from a single fault takes place promptly while subsequent reopenings take place only after the lapse of a predetermined time following each closing operation.

The automatic reclosing mechanism may correspond to what is known to the trade as the Westinghouse RC automatic recloser and is indicated generally by the numeral 297. The operation of the reclosing mechanism is initiated by the closing of the cam switches 226 and 228 upon the opening of the circuit breaker switch AS. The reclosing circuit breaker mechanism includes a plurality of motor-operated switches indicated by the drum 298 actuated by a synchronous motor 299 through suitable gearing mechanism 302 for the switches being represented in the drawings as a plurality of conducting segments 303, 304, 305, 306, 307 and 308, together with the contact fingers cooperating therewith. The segments 304 and 305 are represented as a development of contact segments which are continuous throughout the circumference of the drum except for the omission shown in the drawings, that is, the upper ends of these segments are continuous with the lower ends. All drum segments are moved downwardly as viewed in the drawings. The drum 298 is shown in its reset position which is the normal position when the circuit breaker AS is closed.

Upon the closing of the cam switch 226, a circuit is completed from the supply conductor 92 through the contact member CM2 of the manual control switch, the several contact members 1BR1, 2BR1 and 3BR1 of the three thermal relays, the cam switch 226, conductor 309, contact finger 312, segment 304, contact finger 313, conductor 314, the synchronous motor 299 and conductor 315 to the supply conductor 93, thus initiating the operation of the reclosing mechanism which controls a plurality of reclosing operations in case the fault is not cleared by the first opening of the circuit breaker switch AS. The conducting segments 304 and 305 control the operation of the reclosing motor causing it to start after an automatic opening of the breaker AS through the circuit just traced and to stop either at a "reset" or at a "lock-out" position, depending on whether the breaker remains closed or trips out after the final reclosure. The drum 298 is shown in its "reset" position, and will be operated again to that position upon the clearing of the fault providing this occurs before the reclosing mechanism is operated through its complete cycle effecting a predetermined number of reclosures determined by the number of contact members 306, 307 and 308, here illustrated as three, employed for effecting a corresponding number of reclosures in case the fault is not cleared upon a like number of openings of the circuit breaker.

The closing of the cam switch 228 completes a circuit from junction point 316 through conductor 317, the contact fingers 318 and 319, drum segment 206, the relay contact member 1Y2, relay winding 1X and cam 228 to the supply conductor 93, causing the relay 1X to close its contact members 1X1 and 1X2. The contact 1X1 seals in the relay 1X maintaining it energized until the cam switch 228 opens and the contact 1X2 closes an energizing circuit for the winding of relay 1Y, causing the relay contact members 1Y1 and 1Y3 to close and the relay contact member 1Y2 to open. The closing of the contact member 1Y1 completes a circuit from the supply conductor 92 through cam switch 229, the manual control lock-in relay contacts LI2 and the winding 2X of the circuit breaker auxiliary closing contactor which closes its contacts 2X1, completing a circuit through the circuit breaker closing coil 219, causing the circuit breaker switch to close as previously described. Referring to Fig. 8 it will be noted that the cam 217 moves through an angle x during the closing of the circuit breaker switch AS. For the portion of this movement represented by the angle y the cam switch 230 is closed. It closes before the pin 223 engages the edge of the cam 216 to start the switch closing movement and it opens slightly before the closing movement is completed. While closed the cam switch 230 maintains the circuit through the windings 2X and 2Y, so that it is not interrupted by the cam switch 229 which opens as the switch AS closes, thus insuring a completion of the closing operation once started.

The opening of the cam switch 228 upon the closing of the circuit breaker AS deenergizes the coils of relays 1X and 1Y. The relay 1Y, however, upon closing was latched in such a way (see Fig. 6B) that upon the deenergization of the coil 1Y the relay resets only to the extent of opening the contacts IY1, the contacts IY2 being latched open and the contacts IY3 being latched closed until tripped by a cam at a later time in the operation of the reclosing mechanism. The contact IY2 being latched in its open position prevents "pumping" should the breaker trip immediately after closing. The latch maintaining the contacts IY2 separated is tripped by a cam after the circuit through the contact fingers 318 and 319 is interrupted by movement of segment 306 to a circuit interrupting position. The contacts IY3 in their latched position maintain the continuity of the circuit through the synchronous motor 299 until the contact segment 305 has moved sufficiently to engage the contact finger 322 to complete a motor operating circuit through segment 305 and contact fingers 322 and 323.

The above described operation constitutes an immediate first or initial reclosure of the switch AS, which is effective through the contact segment 306 in its "reset" or illustrated position before the drum 298 has had time to move appreciably away from its illustrated or "reset" position. If this initial opening of the circuit breaker switch AS clears the fault, the motor 299 continues to operate to effect one complete revolution of the drum 298 through the circuit including the cam switch 227, which is closed when the switch AS is closed, and the segment 305 until this segment reaches its illustrated position when the circuit through the segment 305 and contact member 322 is interrupted. Prior to the completion of this cycle of operation, the conducting segment 303 bridges the contact fingers 324 and 325 to complete a circuit through the coil TLO3 of the toggle relay operating the contacts TLO1 to their circuit closing positions so that upon the occurrence of a later fault, a circuit may be completed through any one of the contact members 1SC1, 2SC1 or 3SC1 of the relays 1SC, 2SC and 3SC, respectively, to initiate a subsequent initial operation of the circuit breaker AS.

If upon the initial opening and closing of the circuit breaker as above described the fault is not cleared, the fault current causes operation of one of the CO relays 1CO, 2CO or 3CO at a time interval as indicated on the chart in Fig. 13 to close the corresponding relay contact member 1CO1, 2CO1, or 3CO1 shown in Fig. 6A. The instantaneous second operation in the reclosing cycle upon closure of the contacts 1SC1 of the relay 1SC is prevented by the interruption of the circuit therethrough at the relay contact member TLO1 as above described. The reenergization of the winding TC through the contact member 1CO1 again releases the brake and permits the switch AS to open, the brake being maintained energized through the cam switch 224 until the next closing operation of the switch is substantially completed. The second opening of the circuit breaker AS again causes the cam switches 228 and 226 to close and the cam switch 227 to open, thus interrupting the circuit to the motor 299 through segment 305, but maintaining it through segment 304. At the time of the second opening of the switch AS, the conducting segment 306 has moved to interrupt the circuit between contact fingers 318 and 319 so that the above traced circuit for energizing the relay coil IX, as above described effecting the first reclosing of the circuit breaker does not immediately take place upon subsequent reclosings, but only after the drum 298 has moved sufficiently to cause the contact segment 306 to engage fingers 318 and 319, at which time the relay IX closes its contact members IX1 and IX2, causing relay IY to close its contacts IY1, which, in turn causes the operation of the relay 2X to energize the closing coil 219 and cause a second reclosure of the switch AS as above described with respect to the first reclosing thereof.

If the second opening of the circuit breaker AS effects an elimination of the fault causing the relays to operate, the drum 298 of the reclosing mechanism will continue to operate to its "reset" position, the motor circuit being maintained through cam switch 227 and drum segment 305 as above described until the contact finger 322 separates from the segment 305 in the illustrated or "reset" position of the drum. If, upon the second opening and closing of the switch AS, as above described, the fault still exists on the line, the CO relay will again operate in a manner described for the second reopening of the switch AS to effect a third reopening thereof, the energization of the winding of the relay IX this time being completed through the segment 308 on the drum switch and the cycle of operation being the same as for the second reopening. Thus with any given number of segments 306, 307 and 308 provided, a corresponding number of reclosing operations can be effected. If the fault is maintained after the last reclosing, which would be the third reclosing for the number of segments illustrated on the drum 298, a subsequent reopening of the switch would not be followed by a reclosing operation, the circuit through the motor in that case being maintained through cam switch 226 and conducting segment 304 until the drum reaches a position to effect the separation of the segment 304 from the contact finger 313 to stop the motor in the "lock-out" position of the reclosing mechanism. In this position of the mechanism the circuit breaker switch AS must be closed manually.

The reclosing circuit breaker mechanism will operate in the manner above described in response to any fault causing the operation of any of the "SC" type relays, "CO" type relays, "CW" type relays or the GR relay that is responsive to ground current between the neutral point 62 of the low-voltage transformer winding and ground, the reclosing mechanism being operated either to its "reset" or to its "lock-out" position in the same manner as above described when the operation thereof is initiated by the closing of an "SC" type relay.

If an overload of less than three times normal current occurs on the system, or if for any reason any of the relays above described fail to operate in the manner intended to cause operation of the circuit breaker AS, one of the thermal relays 1BR, 2BR or 3BR that is responsive to the temperature of the oil and to the heating of the windings of the three phases, respectively, of the transformer, will function to interrupt the circuit breaker AS at times depending upon the current values existing as shown in curve VIII in Fig. 13. Each of the thermal relays 1BR, 2BR and 3BR is provided with a pair of contacts 1BR2, 2BR2 and 3BR2 that close to operate signal lights 326, 327 and 328, respectively, prior to the heating of the bimetal elements of the relays sufficiently to close their respective contact members 1BR1, 2BR1 and 3BR1 through which the tripping coil TC is energized. The opening of the contact switch AS upon the energization of the trip coil TC takes place in the manner above described, but in this case the corresponding relay contact member 1BR3, 2BR3 or 3BR3 connected between the supply conductor 92 and the junction point 316 interrupts the circuit for operating the reclosing mechanism so that this mechanism remains in its illustrated or "reset" position and is not effective to cause the reclosing of the circuit breaker AS.

A manual control switch CM is provided having contact members CM1, CM2, CM3, CM4 and CM5, the switch having four circuit closing positions indicated on the chart in Fig. 10 as No. 1—trip; No. 2—off; No. 3—operate; and No. 4—closed. When the switch is moved to its No. 1 or "trip" position, the contact CM1 only is closed completing a circuit through the trip coil TC to cause the opening of the switch in the same maner as if closed by any one of the relay contact members. In the "off" position, the contact member CM4 only is closed. This energizes the coil TLO3 of the toggle switch closing contacts TLO1 when the manual switch is moved from its No. 1 or "trip" position through No. 2 position before the No. 3 or "operate" position is reached so that the TLO1 contact will be closed when the switch is in the No. 3 or "operate" position. In the "operate" position, the contact member CM2 only is closed to complete one link in the circuit necessary for the automatic operation of the reclosing circuit breaker as described above. In the fourth or "closed" position of the manually operable switch, the contact members CM2, CM3 and CM5 are all closed. If the circuit breaker switch AS is open when the manual control switch CM is moved to its closed position the contact member CM3 closes a circuit through the cam switch 229 causing the energization of the relay 2X to effect the closing of the circuit breaker switch AS as above described. A circuit is also closed from the supply conductor 92 through contact CM2, coil LI of the manual lock-out relay, contact CM5, the closed cam switch 231, to the supply conductor 93, causing the manual lock-out relay to close a sealing in circuit through its contacts LI1 and to open its contacts LI2 to prevent automatic operation. With these contacts open the closing of the relay contacts 1Y1 will not be effective to energize the coil 2X of the circuit breaker auxiliary closing relay.

As above noted, the circuit for energizing the trip coil TC extends between supply circuit conductors 92 and 93 as closed by any one of the several enumerated relays, the contact members of which are shown in vertical alignment in Fig. 6A. The normal source of supply of energy for maintaining the voltage between the supply circuit conductors 92 and 93 is the auxiliary transformer AT that is connected to the supply conductors 92 and 93 through safety switch 87 and contact members 88 and 89 of the double-throw switch DTS. A transfer switch SV is provided, the operative winding of which is connected to the secondary winding 332 of a current transformer, the primary winding 33 of which is connected in shunt relation to a resistor 334 and by circuit conductors 335 and 336 to a secondary winding 337 of the current transformer 109 that is connected in the same phase conductor as the auxiliary transformer AT. The relay SV has two pair of contacts SV1 shown open and SV2 shown closed, and through the latter of which a connection is normally maintained between the supply conductor 92 and junction point 292 that is connected to one side of the several relay contact members through which a circuit is completed to energize the trip coil TC. It will be noted that the auxiliary transformer AT is responsive to the voltage between the distribution line conductor L3 and ground and that the current transformer 109 is responsive to the current flowing in the conductor L3. Should a fault occur between that distribution line conductor and ground of sufficient current carrying capacity to decrease the voltage across the transformer AT below a predetermined value, this increase in current through the transformer 109 will impress a voltage on the relay winding SV that is sufficient to operate the relay to separate the members SV2 and close the contact members SV1, thus connecting the secondary winding 332 of the transformer associated with the relay SV between the junction point 292 and the supply conductor 93 to serve as a source of energy for the trip coil TC. The provision of this relay insures an adequate source of energy supply for effecting the operation of the circuit breaker AS independently of fault conditions that may occur on the secondary distribution circuit.

Many modifications in the circuits and apparatus illustrated and described may be made within the spirit of my invention, and I do not wish to be limited otherwise than by the scope of the appended claims.

I claim as my invention:

1. A transformer installation comprising, in combination, a conducting casing, a transformer therein having high-voltage and low-voltage windings, high-voltage insulating bushings mounted on the cover of said casing through which extend leads connecting said high-voltage windings to high-voltage circuit conductors, lightning arresters mounted on the outside of said casing and connected between said respective high-voltage circuit conductors and ground for providing an excess-voltage discharge from said conductor to ground in response to a predetermined voltage-increase over normal, a protective gap provided on each of said high-voltage insulating bushings for providing an excess-voltage discharge from said lead to ground upon a higher predetermined voltage-increase over normal than that required to effect a discharge through said lightning arrester, a fusible link within said casing between said bushing lead and said high voltage winding for automatically open circuiting said lead in response to a short circuit current therethrough, said link being of a current carrying capacity sufficient to carry the maximum primary winding current occasioned by a short circuit at the terminals of the low-voltage windings.

2. A transformer installation comprising, in combination, a conducting casing, a transformer therein having high-voltage and low-voltage windings, high-voltage insulating bushings mounted on the cover of said casing through which extend leads connecting said high-voltage windings to high-voltage circuit conductors, lightning arresters mounted on the outside of said casing and connected between said respective high-voltage circuit conductors and ground for providing an excess-voltage discharge from said conductor to ground in response to a predetermined voltage-increase over normal, a protective gap provided on each of said high-voltage insulating bushings for providing an excess-voltage discharge from said lead to ground upon a higher predetermined voltage-increase over normal than that required to effect a discharge through said lightning arrested, a fusible link mounted on the inner end of the bushing for interrupting the circuit between the bushing lead and the high-voltage windings to protect said windings against short circuit current therethrough, said link being of a current carrying capacity sufficient to carry the maximum primary winding current occasioned by a short circuit on the low-voltage winding circuit.

3. A transformer installation comprising, in combination, a conducting casing having a plurality of compartments, a transformer having high-voltage and low-voltage windings contained in one of said compartments, a fusible link in said compartment for interrupting the circuit through the high-voltage winding upon a predetermined short circuit current, a circuit breaker within said casing for interrupting the circuit through the low-voltage winding, control means for said circuit breaker comprising current relay means responsive to the low-voltage circuit conditions for operating said circuit breaker and thermal control means responsive to transformer conditions, said several devices being so coordinated that the current relay means is effective to operate the circuit breaker upon a current of a predetermined value above normal for a short interval of time, and the thermal control means to operate said circuit breaker upon a current of a predetermined value for a longer period of time.

4. A transformed installation comprising, in combination, a conducting casing, a transformer within said casing having high-voltage and low-voltage windings, terminal conductors from the several windings, a fusible link within the casing in circuit with the high-voltage terminal conductors for interrupting the circuit therethrough upon a predetermined current flow therethrough, a circuit breaker within said casing for interrupting the current through the low-voltage winding, and a plurality of devices for effecting the operation of the circuit breaker including a plurality of current responsive relay means and thermal control means, said devices being so coordinated that one current relay means operates substantially instantaneously upon a predetermined excess current in the low-voltage circuit to operate the circuit-breaker, another current relay means being responsive after a predetermining variable time interval depending upon the current flowing in the low-voltage circuit and including a lesser value of current than that required to trip the first named relay means for operating the circuit breaker, said thermal control means being operative in response to continued overload after a predetermined variable time interval of greater duration than the above named means for operating said circuit breaker, and said fusible link requiring a greater increase in excess current than any other circuit controlling device to interrupt the current flow.

5. A transformer installation comprising, in combination, a transformer having high-voltage and low-voltage windings, a fusible link in circuit with the high-voltage winding for interrupting the high-voltage circuit upon a predetermined current flow therethrough, a circuit breaker for interrupting the current through the low-voltage winding, and a plurality of devices for interrupting the flow of power through said transformer including an instantaneous current responsive relay, a time delay current responsive relay, a thermal control, and said fusible link, said several devices being coordinated with respect to time to respond over a predetermined range of overload currents in the order named, the three named relays being operative for controlling the operation of the circuit breaker.

6. A transformer installation comprising, in combination, a transformer having high-voltage and low-voltage windings, a fusible link in circuit with the high-voltage winding for interrupting the circuit therethrough upon a predetermined current flow therethrough, a circuit breaker within said casing for interrupting the current through the low-voltage winding, a plurality of devices for interrupting the flow of power through said transformer including an instantaneous current responsive relay, a time delay current responsive relay, a thermal control means, and said fusible link coordinated with respect to time to respond over a predetermined range of overload currents in the order named, the three named relays being operative for controlling the operation of the circuit breaker, automatic reclosing circuit breaker mechanism for reclosing the circuit breaker if opened by operation of the first two named relays, and lockout means controlled by said thermal control means for preventing operation of the reclosing mechanism when the circuit breaker is opened by operation of the thermal control means.

7. A transformer installation comprising, in combination, a transformer having high-voltage and low-voltage windings, a fusible link in circuit with the high-voltage winding for interrupting the circuit therethrough upon a predetermined current flow therethrough, a circuit breaker within said casing for interrupting the current through the low-voltage winding, and a plurality of devices for controlling the operation of said circuit breaker including an instantaneous current responsive relay, a time delay current responsive relay and a thermal control means, all responsive to low-voltage circuit conditions, said several circuit breaker controlling devices being coordinated with respect to time to respond over a predetermined range of overload currents in the order named, the range of operation of said three circuit breaker controlling devices extending to lower current values than the fusible link, the range of operation of the time delay relay extending to lower current values than the instantaneous current responsive relay, and the range of operation of the thermal control means extending to lower current values than the other circuit breaker controlling devices.

8. A transformer installation comprising, in combination, a transformer having high-voltage and low-voltage windings, a fusible link in circuit with the high-voltage winding for interrupting the circuit therethrough upon a predetermined current flow therethrough, a circuit breaker for interrupting the current through the low-voltage winding, and a plurality of devices for controlling the flow of power through said transformer including an instantaneous current responsive relay, a time delay current responsive relay, a thermal control means, all responsive to low-voltage circuit conditions, and said fusible link responsive to high-voltage circuit conditions, said several devices being coordinated with respect to time to respond over a predetermined range of overload currents in the order last above named, the three devices last named being operative for controlling the operation of the circuit breaker, said several devices except the first named responding to operate the circuit breaker at varying time intervals that are greater as the overload current is less.

9. A transformer installation comprising, in combination, a transformer having high-voltage and low-voltage windings, a fusible link in circuit with the high-voltage winding for interrupting the circuit therethrough upon a predetermined current flow therethrough, a circuit breaker for interrupting the current through the low-voltage winding, and a plurality of devices for controlling the operation of said circuit breaker including an instantaneous current responsive relay, a time delay current responsive relay, a thermal responsive means coordinated with respect to time to respond over a predetermined range of overload currents in the order named, the fusible link being designed to withstand continuous overload current of approximately one half the value obtained by a short circuit at the low-voltage terminals of the transformer.

10. A transformer installation comprising, in combination, a conducting casing, a transformer within said casing having high-voltage and low-voltage windings, a fusible link in circuit with the high-voltage winding for interrupting the circuit therethrough upon a predetermined current flow therethrough, a circuit breaker within said casing for interrupting the current through the low-voltage winding, a plurality of devices for controlling the operation of the circuit breaker including an instantaneous current responsive relay, a time delay current responsive relay, and a thermal responsive means coordinated with respect to time to respond over a predetermined range of overload currents in the order named, the fusible link being designed to withstand for an appreciable time an overload current corresponding to that value obtained by a short circuit at the low voltage terminals.

11. A transformer installation comprising, in combination, a conducting casing, a transformer within said casing having high-voltage and low-voltage windings, a fusible link in circuit with the high voltage winding for interrupting the circuit therethrough upon a predetermined current flow therethrough, a circuit breaker within said casing for interrupting the current through the low-voltage winding, and a plurality of devices for controlling the operation of said circuit breaker including an instantaneous current responsive relay, a time delay current responsive relay, and a thermal responsive means coordinated with respect to time to respond over a predetermined range of overload currents in the order named, the fusible link being so designed as to withstand without fusing a current less than that resulting from a fault on the low-voltage circuit exterior of the transformer structure.

12. A transformer installation comprising, in combination, polyphase high-voltage and low-voltage windings, high-voltage circuit conductors connected to the several high-voltage windings, low-voltage circuit conductors connected to the several low-voltage windings, a ground connection from the neutral point of the low-voltage winding to ground, and protective equipment for said transformer comprising a circuit breaker for interrupting the current through the low-voltage winding and means for operating said circuit breaker including a relay responsive to current flow in said ground connection, a relay responsive to reverse power flow in the low-voltage circuit, and a relay responsive to a predetermined overload current in the low-voltage circuit.

13. A transformer installation comprising, in combination, polyphase high-voltage and low-voltage windings, conductors connected to the several high-voltage windings, conductors connected to the several low-voltage windings, a ground connection from the neutral point of the low-voltage winding to ground, protective equipment for said transformer comprising a circuit breaker for interrupting the current through the low-voltage winding and means for operating said circuit breaker including a relay responsive to current flow in said ground connection, a relay responsive to reverse power flow in the low-voltage circuit, and a relay responsive to a predetermined overload current in the low-voltage circuit, and mechanism rendered effective upon the opening of the circuit breaker to reclose it and to repeatedly reclose it upon repeated openings for a predetermined number of operations and to ultimately prevent its reclosing.

14. A transformer installation comprising, in combination, a conducting casing, a transformer having polyphase high-voltage and low-voltage windings, a ground connection from the neutral point of the low-voltage winding to ground, protective equipment for said transformer comprising a circuit breaker for interrupting the current through the low-voltage winding and means for operating said circuit breaker including a relay responsive to current flow in said ground connection, a relay responsive to reverse power flow in the low-voltage circuit, and a relay responsive to a predetermined overload current in the low-voltage circuit, mechanism rendered effective upon the opening of the circuit breaker to reclose it and to repeatedly reclose it upon repeated openings for a predetermined number of operations and to then prevent its further reclosing, and a thermal responsive means responsive to the temperature of the transformer windings for operating the circuit breaker and for preventing operation of the reclosing mechanism.

15. A transformer installation comprising, in combination, a transformer having polyphase high-voltage and low-voltage windings, high-voltage circuit conductors connected to the several high-voltage windings, low-voltage circuit conductors connected to the several low-voltage windings, a ground connection from the neutral point of the low-voltage winding to ground, protective equipment for said transformer comprising a circuit breaker for interrupting the current through the low-voltage winding and means for operating said circuit breaker including a reverse power flow relay in each phase of the low-voltage circuit, a relay in each phase conductor promptly responsive to a predetermined overload current, a relay in each phase conductor responsive to variable values of overload current after a time interval dependent upon the current values, and a relay in said ground connection, and mechanism rendered effective upon the opening of said circuit breaker by any of the above-named relays to reclose it and to repeatedly reclose it upon repeated openings for a predetermined number of operations and to then prevent its further reclosing.

16. A transformer installation comprising, in combination, a transformer having polyphase high-voltage and low-voltage windings, high-voltage circuit conductors connected to the several high-voltage windings, low-voltage circuit conductors connected to the several low-voltage windings, a ground connection from the neutral point of the low-voltage winding to ground, protective equipment for said transformer comprising a circuit breaker for interrupting the current through the low-voltage winding and means for operating said circuit breaker including a reverse-power-flow relay in each phase of the low-voltage circuit, a relay in each phase conductor promptly responsive to a predetermined overload current, a relay in each phase conductor responsive to variable values of overload current after a time interval dependent upon the current value, and a relay in said ground connection, reclosing mechanism rendered effective upon the opening of said circuit breaker by any of the above-named relays to reclose it, the same being effective to repeatedly reclose said circuit breaker upon repeated openings for a predetermined number of operations, and to then prevent its further reclosing, thermal control means responsive to the temperature of each low-voltage phase winding for operating said circuit breaker and means responsive to the operation of said thermal control means for preventing operation of the reclosing mechanism.

17. A transformer installation comprising, in combination, a transformer having polyphase high-voltage and low-voltage windings, high-voltage circuit conductors connected to the several high-voltage windings, low-voltage circuit conductors connected to the several low-voltage windings, protective equipment for said transformer comprising, a circuit breaker for interrupting the circuit through the low-voltage winding and means for operating said circuit breaker comprising a relay in each phase conductor promptly responsive to a predetermined overload current, a relay in each phase conductor responsive at varying time intervals to varying overload currents and including current values below that required to trip the first named relay, automatic reclosing mechanism operative upon opening of the circuit breaker to reclose it repeatedly and to continue to a lockout position to prevent further closing if the overload current persits upon repeated reclosing, and operative to a reset position if the overload current clears prior to the mechanism reaching its lockout position, and switch means operative upon the first opening of the circuit breaker to prevent further control thereof by said promptly responsive overload relays until the reclosing mechanism again reaches its reset position.

18. A transformer installation comprising, in combination, a transformer having polyphase high-voltage and low-voltage windings, high-voltage circuit conductors connected to the several high-voltage windings, low-voltage circuit conductors connected to the several low-voltage windings, protective equipment for said transformer comprising a circuit breaker for interrupting the circuit through the low-voltage winding, electrically energized circuit breaker operating mechanism and a source of energy therefor comprising supply circuit conductors, a voltage transformer connected between a phase conductor and ground for applying voltage to said supply circuit conductors, a current transformer associated with the same phase conductor, and means responsive to a predetermined current in said phase conductor for disconnecting said supply circuit conductors from said voltage transformer and for connecting them to said current transformer.

19. A transformer installation comprising, in combination, a power transformer, a power circuit connected to said power transformer comprising power circuit conductors, electrically energized protective means for said transformer and a source of energy therefor comprising an auxiliary transformer energized in accordance with the voltage of said power circuit and normally available for supplying energy to said protective means, a transformer energized in accordance with the current of said power circuit, and means responsive to a predetermined output from said last named transformer for interrupting the availability of the first named auxiliary transformer and for establishing the availability of the last named transformer.

20. A transformer installation comprising, in combination, a transformer having high-voltage and low-voltage windings, a circuit breaker for interrupting the current through the low-voltage winding, and a plurality of devices for controlling the operation of the circuit breaker including an instantaneous current responsive relay, a time delay current responsive relay and a thermal responsive device, coordinated with respect to time to respond over a predetermined range of overload currents in the order named, automatic reclosing circuit breaker mechanism for reclosing the circuit breaker if opened by operation of the first two named relays, and lockout means controlled by said thermal responsive device for preventing operation of the reclosing mechanism when the circuit breaker is opened by operation of the thermal responsive device.

21. A transformer installation comprising, in combination, a transformer having high-voltage and low-voltage windings, a fusible link for interrupting the high-voltage winding circuit, a circuit breaker for interrupting the current through the low-voltage winding, and a plurality of devices for controlling the operation of said circuit breaker including an instantaneous current responsive relay, a time delay current responsive relay, and a thermal responsive device, coordinated with respect to time to respond over a predetermined range of overload currents in the order named to operate the circuit breaker, the range of operation of said three devices extending to lower current values than the fusible link, the range of operation of the time delay relay extending to lower current values than the instantaneous current responsive relay, and the range of operation of the thermal responsive device extending to lower current values than the other devices.

22. A transformer installation comprising, in combination, a transformer having high-voltage and low-voltage windings, a circuit breaker within said casing for interrupting the current through the low-voltage winding, and a plurality of devices for controlling the operation of said circuit breaker including an instantaneous current responsive relay, a time delay current responsive relay, and a thermal responsive device, coordinated with respect to time to respond over a predetermined range of overload currents in the order named, said several devices except the first named responding at varying time intervals that are greater as the overload current is less.

23. A transformer installation comprising, in combination, a transformer having polyphase high-voltage and low-voltage windings, high-voltage circuit conductors connected to the several high-voltage windings, low-voltage circuit conductors connected to the several low-voltage windings, protective equipment for said transformer comprising, a circuit breaker for interrupting the circuit through the low-voltage windings, and means for operating said circuit breaker comprising a relay in each phase conductor promptly responsive to a predetermined overload current, a relay in each phase conductor responsive at varying time intervals to varying overload currents and including current values below that required to trip the first named relay, automatic reclosing mechanism operative upon opening of the circuit breaker to reclose it repeatedly and to continue to a lockout position to prevent further closing if the overload current persists upon repeated reclosing and operative to a reset position if the overload current clears prior to the mechanism reaching its lockout position, and switch means operative upon the first opening of the circuit breaker to prevent further control thereof by said promptly responsive overload relays until the reclosing mechanism again reaches its reset position.

24. A transformer installation comprising, in combination, a transformer having polyphase high-voltage and low-voltage windings, high-voltage circuit conductors connected to the several high-voltage windings, low-voltage circuit conductors connected to the several low-voltage windings, protective equipment for said transformer comprising a circuit breaker for interrupting the circuit through the low-voltage windings, electrically energized circuit breaker operating mechanism and a source of energy therefor comprising supply circuit conductors, a voltage transformer connected between a phase conductor and ground for applying voltage to said supply circuit conductors, a current transformer associated with the same phase conductor, and means responsive to a predetermined current in said phase conductor for disconnecting said supply circuit conductors from said voltage transformer and for connecting them to said current transformer.

25. A transformer installation comprising, in combination, a power transformer, a power circuit connected to said power transformer comprising power circuit conductors, electrically energized protective means for said transformer including a plurality of control circuit, circuit control means there for, and a source of energy therefor comprising an auxiliary transformer energized in accordance with the voltage of said power circuit and normally available for supplying energy to said control circuits, a transformer energized in accordance with the current of said power circuit, and means energized from said transformer and responsive upon a predetermined load current for interrupting the availability of the first named auxiliary transformer for supplying energy to said control circuits and for establishing the availability of the last named transformer.

FRANKLIN L. SNYDER.